April 28, 1942.　　J. M. McDONNELL　　2,280,923
STATISTICAL MACHINE
Filed July 29, 1937　　20 Sheets-Sheet 1

INVENTOR
JOSEPH M. McDONNELL
BY W. A. Sparks
ATTORNEY

April 28, 1942.　　J. M. McDONNELL　　2,280,923
STATISTICAL MACHINE
Filed July 29, 1937　　20 Sheets-Sheet 3

INVENTOR
JOSEPH M. MC DONNELL
BY H. A. Sparks
ATTORNEY

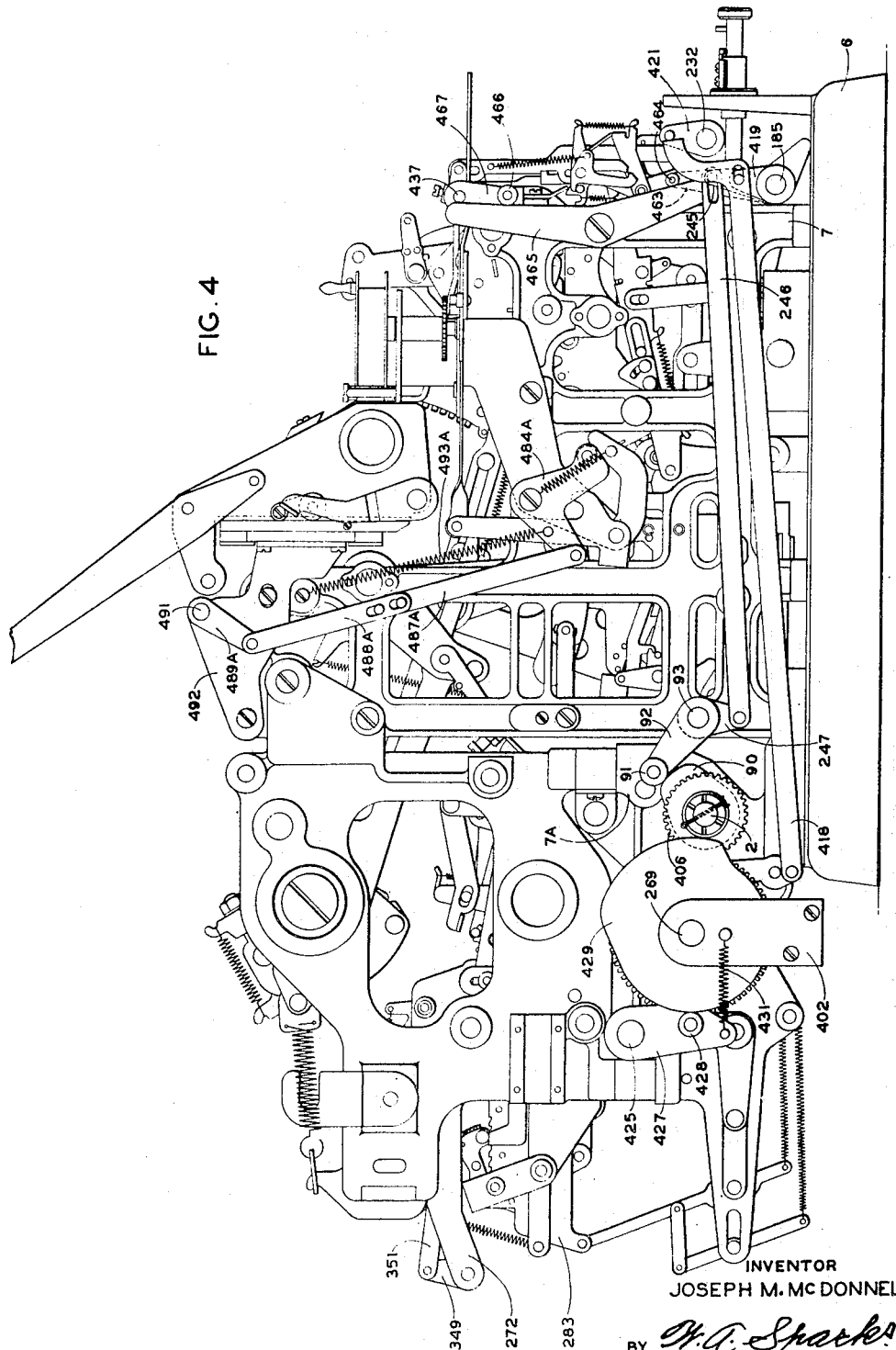

April 28, 1942.    J. M. McDONNELL    2,280,923
STATISTICAL MACHINE
Filed July 29, 1937    20 Sheets-Sheet 5

INVENTOR
JOSEPH M.McDONNELL
BY W. A. Sparks
ATTORNEY

April 28, 1942.
J. M. McDONNELL
2,280,923
STATISTICAL MACHINE
Filed July 29, 1937
20 Sheets-Sheet 7
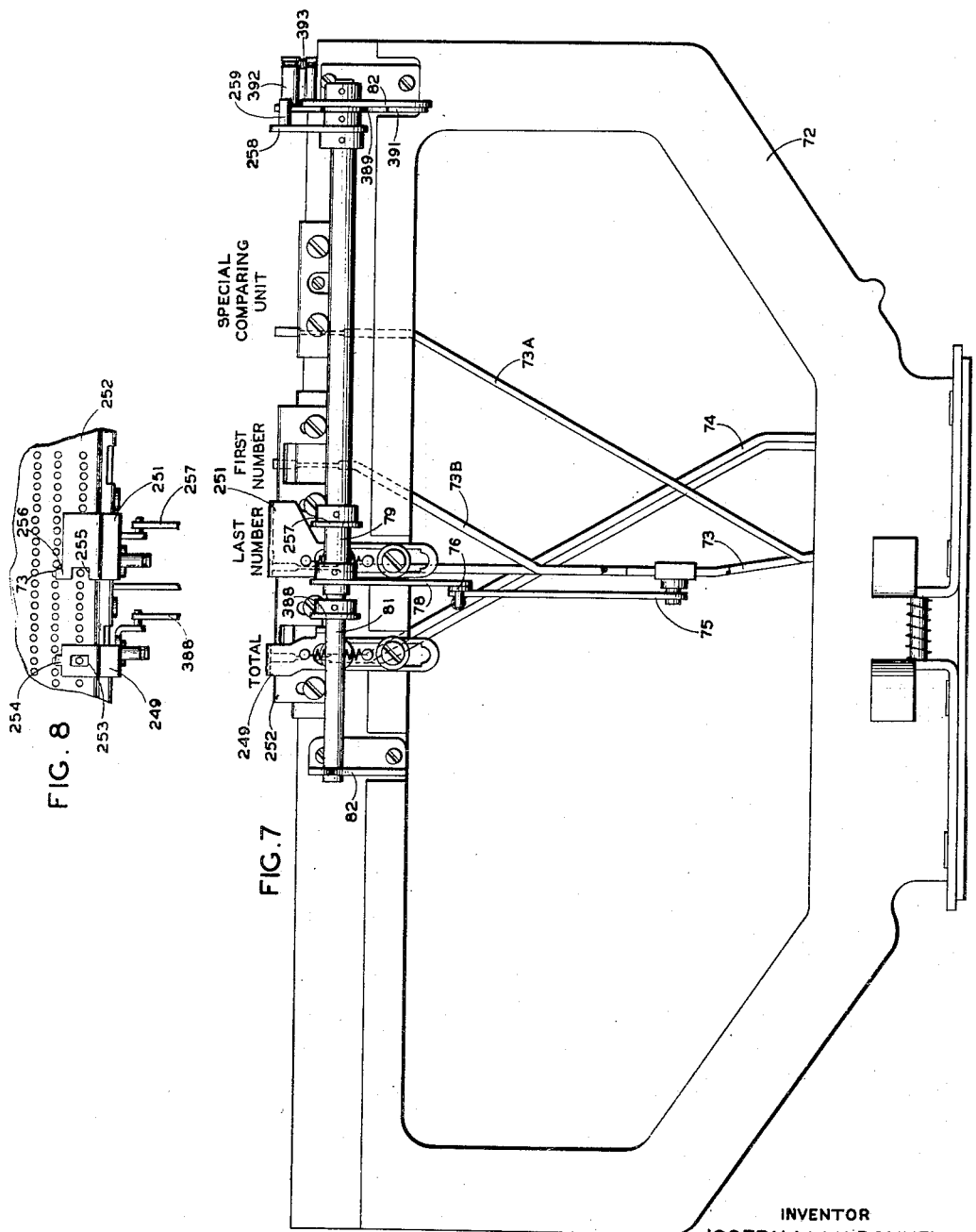
INVENTOR
JOSEPH M. McDONNELL
BY W. A. Sparks
ATTORNEY

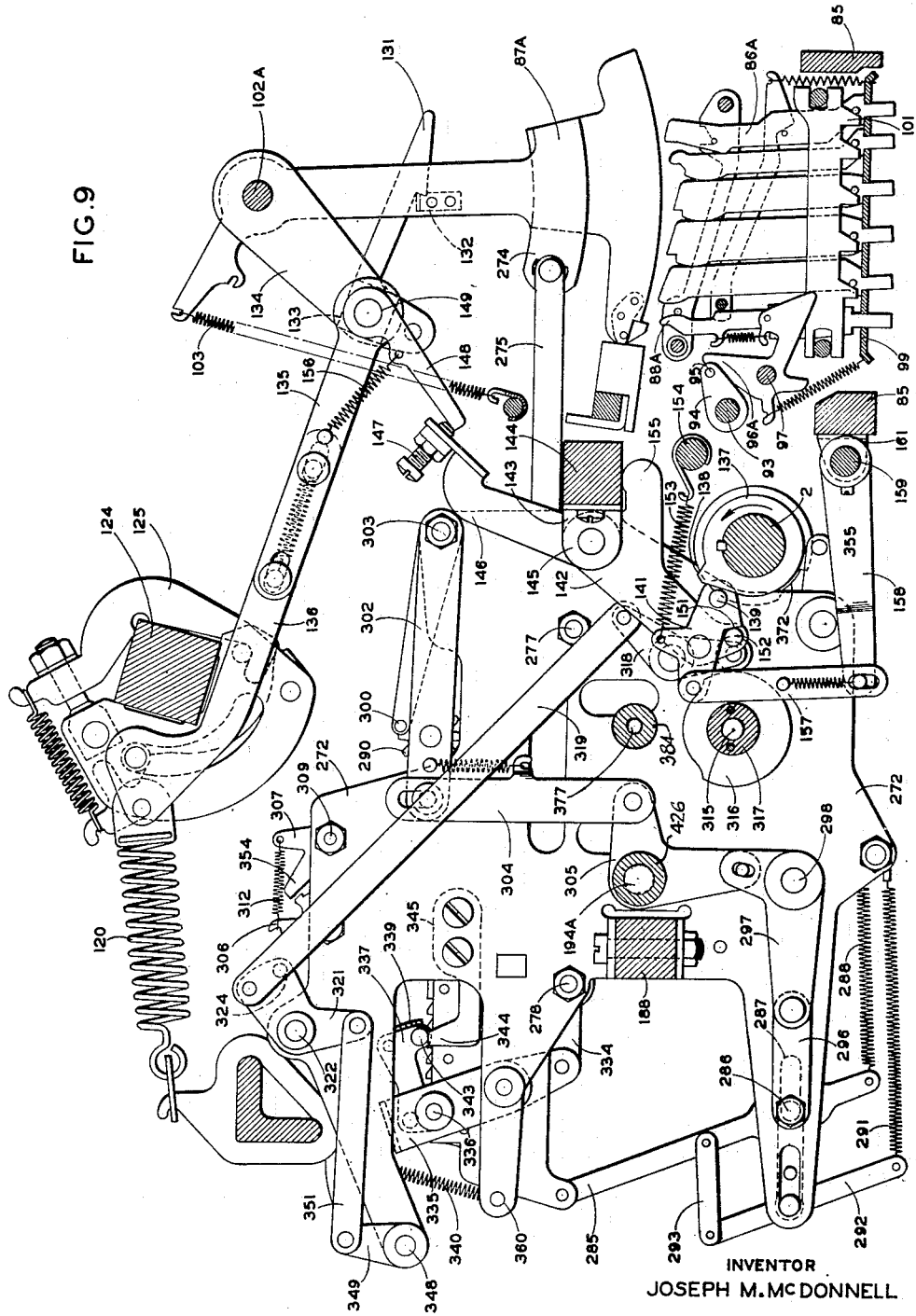

April 28, 1942.  J. M. McDONNELL  2,280,923
STATISTICAL MACHINE
Filed July 29, 1937    20 Sheets-Sheet 9

INVENTOR
JOSEPH M. McDONNELL
BY H. A. Sparks
ATTORNEY

April 28, 1942. J. M. McDONNELL 2,280,923
STATISTICAL MACHINE
Filed July 29, 1937 20 Sheets-Sheet 10

INVENTOR
JOSEPH M. McDONNELL
BY W. A. Sparks
ATTORNEY

April 28, 1942.  J. M. McDONNELL  2,280,923
STATISTICAL MACHINE
Filed July 29, 1937  20 Sheets-Sheet 12

INVENTOR
JOSEPH M. McDONNELL
BY W. A. Spark
ATTORNEY

April 28, 1942.  J. M. McDONNELL  2,280,923
STATISTICAL MACHINE
Filed July 29, 1937    20 Sheets-Sheet 13

INVENTOR
JOSEPH M. McDONNELL
BY *H. A. Sparks*
ATTORNEY

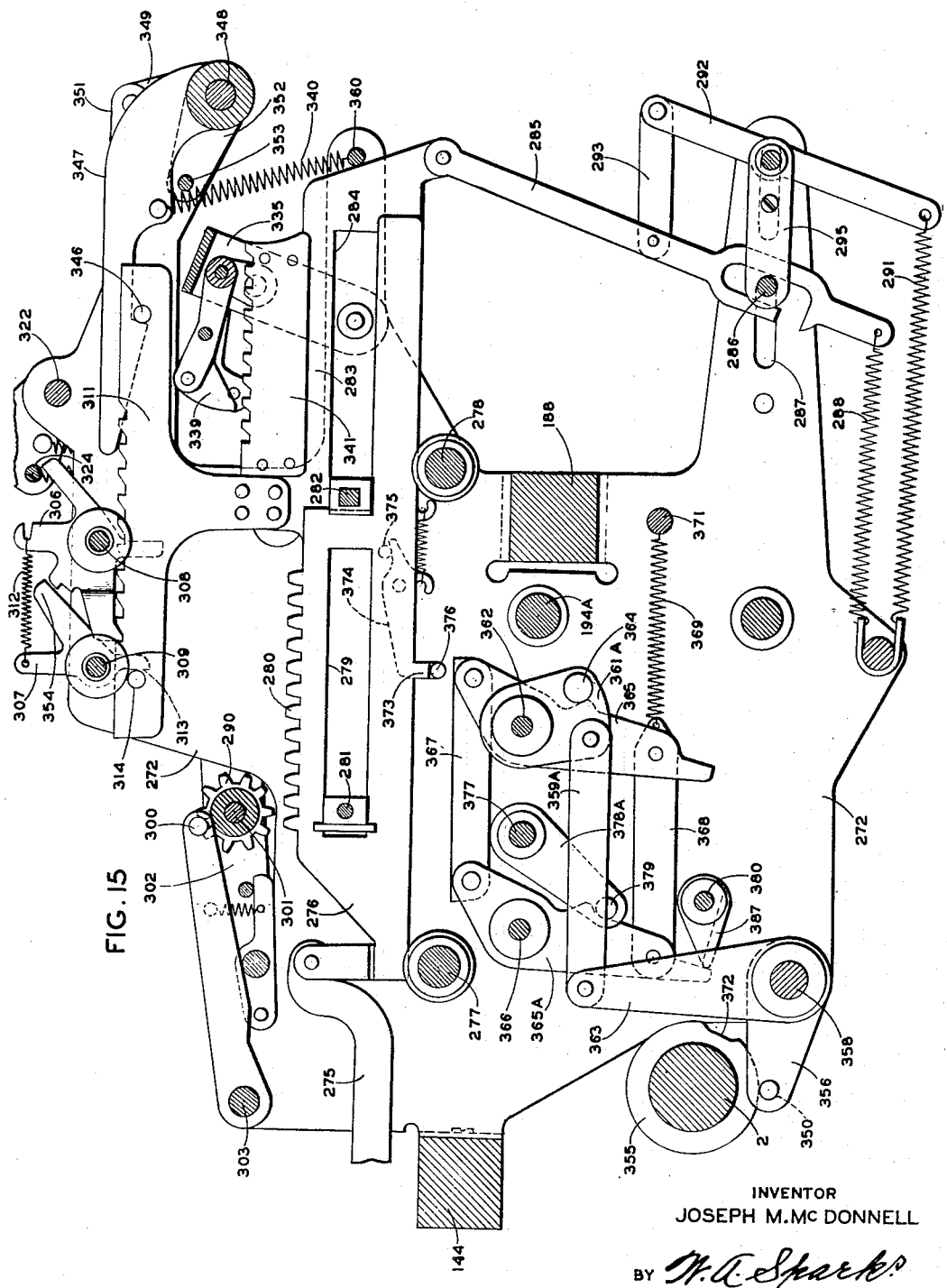

April 28, 1942.  J. M. McDONNELL  2,280,923
STATISTICAL MACHINE
Filed July 29, 1937  20 Sheets-Sheet 15
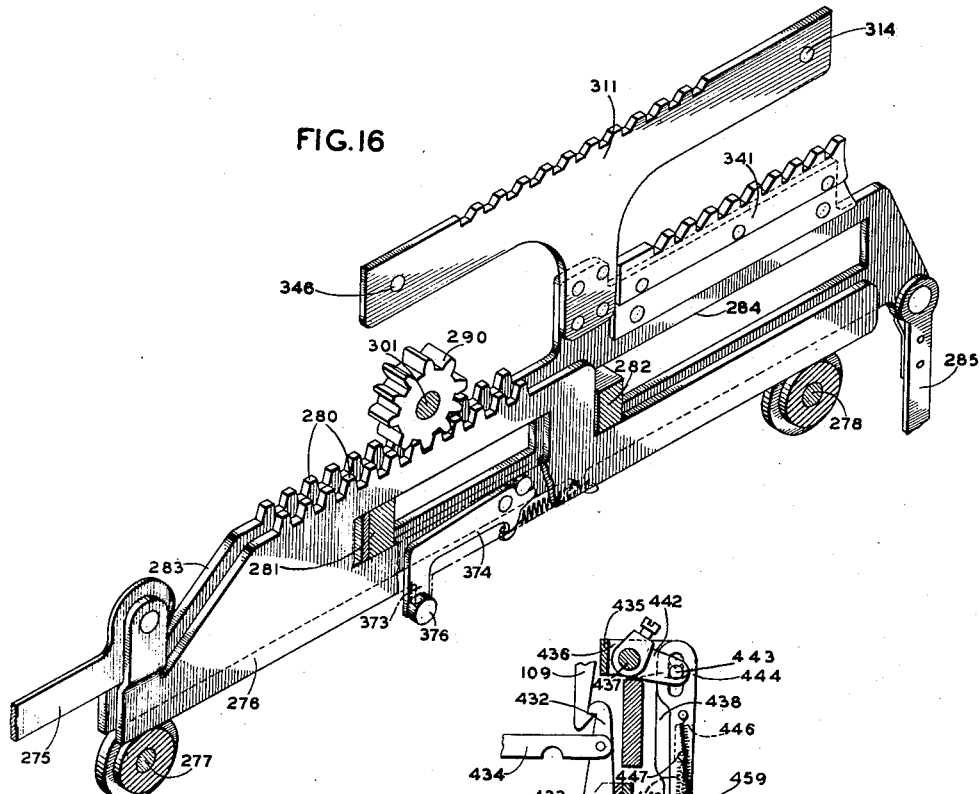
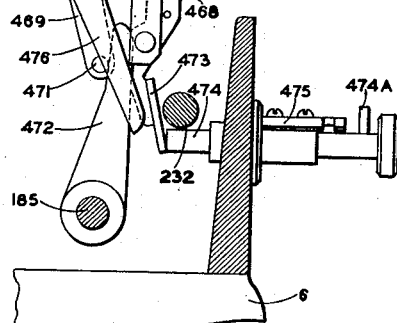
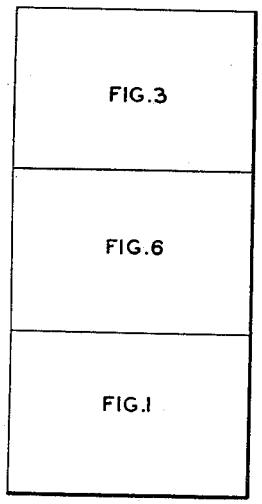
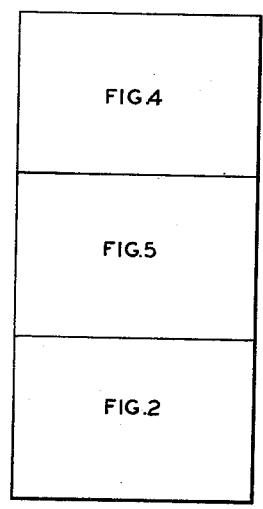
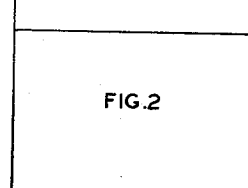
INVENTOR
JOSEPH M. McDONNELL
BY *H. A. Sparks*
ATTORNEY April 28, 1942.  J. M. McDONNELL  2,280,923
STATISTICAL MACHINE
Filed July 29, 1937  20 Sheets-Sheet 16
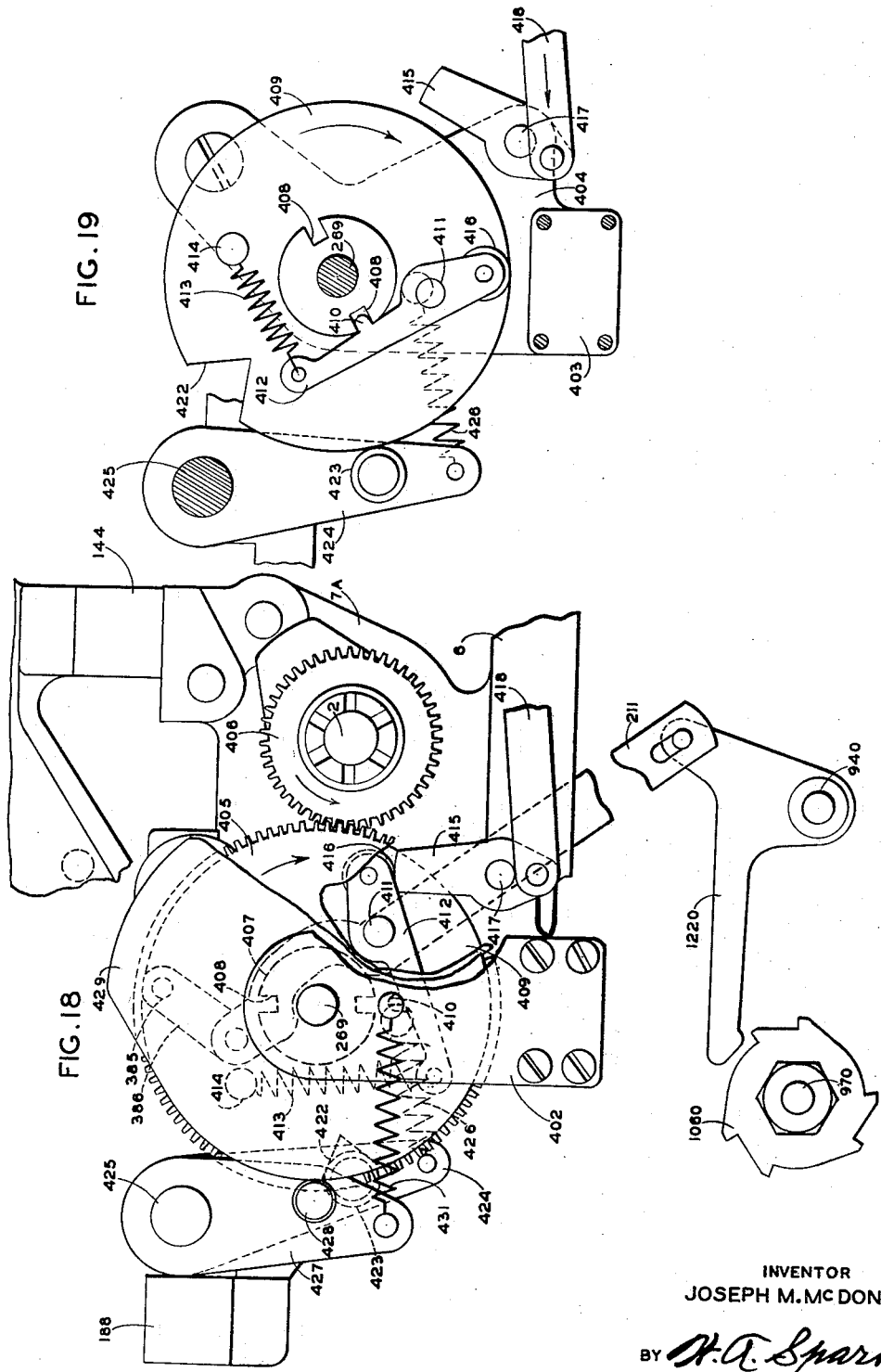
INVENTOR
JOSEPH M. McDONNELL
BY H. A. Sparks
ATTORNEY April 28, 1942.　　J. M. McDONNELL　　2,280,923
STATISTICAL MACHINE
Filed July 29, 1937　　20 Sheets-Sheet 17

INVENTOR
JOSEPH M. McDONNELL
BY H. A. Sparks
ATTORNEY

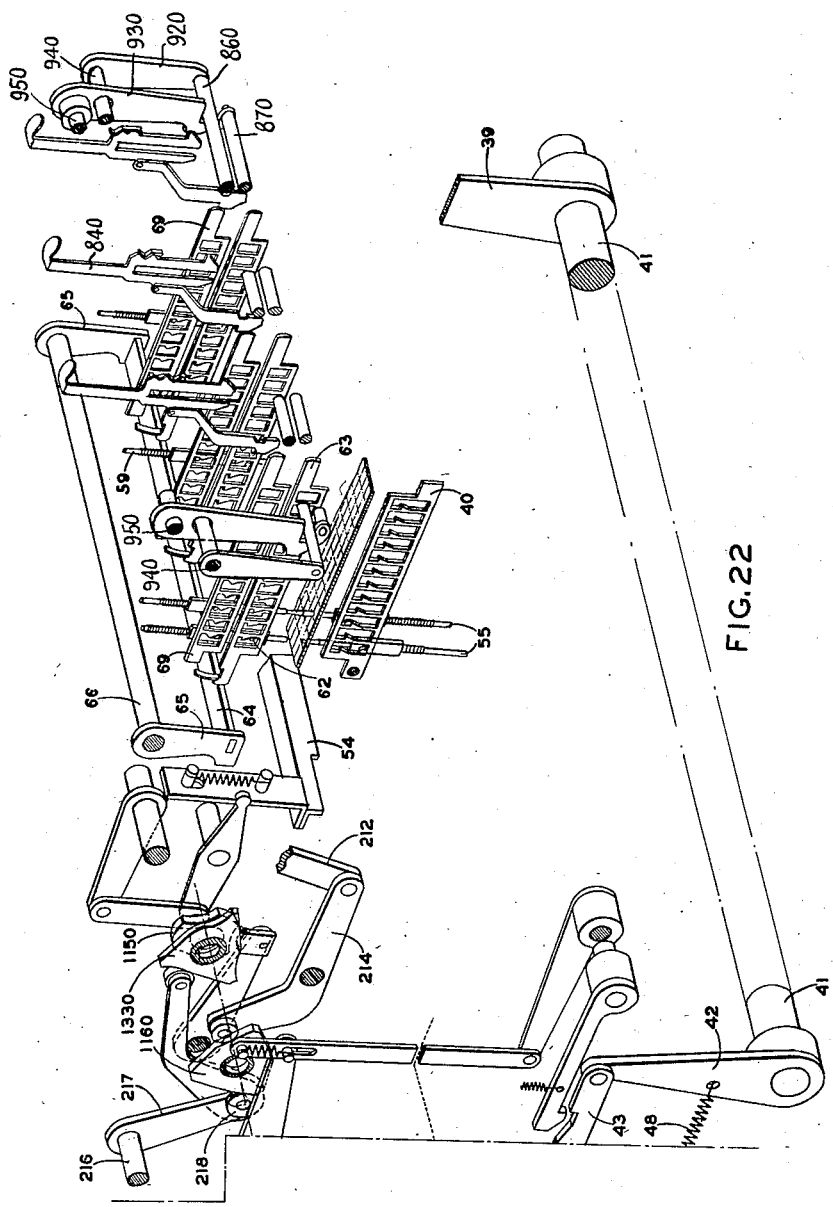

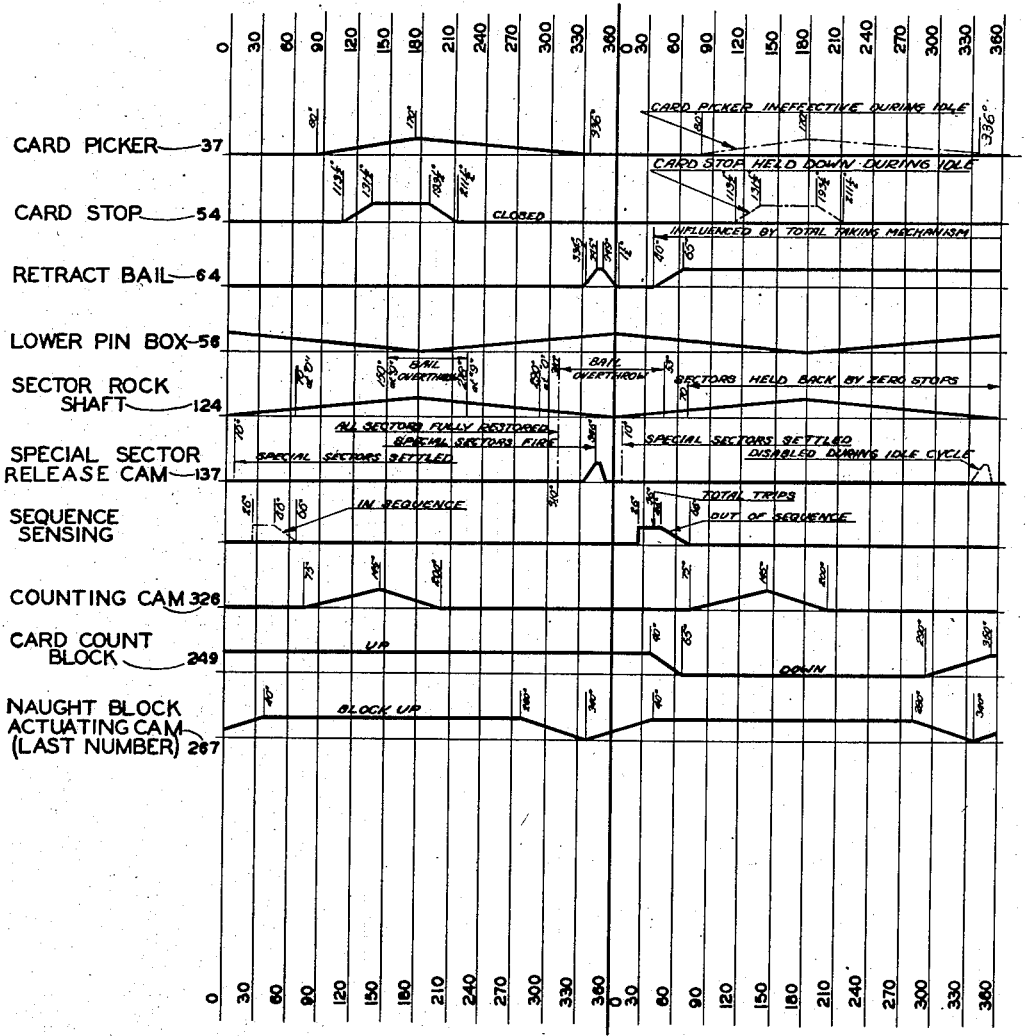

Patented Apr. 28, 1942

2,280,923

UNITED STATES PATENT OFFICE 2,280,923

STATISTICAL MACHINE

Joseph M. McDonnell, Ozone Park, N. Y., assignor to Remington Rand Inc., Buffalo, N. Y., a corporation of Delaware Application July 29, 1937, Serial No. 156,304

7 Claims. (Cl. 235—61.7)

This invention relates generally to punched card accounting machines and more particularly to a machine of this type containing novel comparing and counting mechanism for listing a group of serially numbered sequentially arranged record cards according to the unbroken sequences found therein and for counting the number of cards in each sequence and the total number of cards in an entire group.

A type of accounting problem, to which my invention is particularly well adapted, is one encountered by banks or other bond-handling agencies. The problem briefly is as follows: Assume that a large corporation or municipality issues several hundred thousand serially numbered bonds, or debt certificates, payable, of course, at some future date. At certain specified intervals between the time of purchase and the time of redemption the purchaser of each bond is entitled to collect interest on his investment amounting to a certain set percentage of the value of the bond. Interest payments are effected through several agencies, usually banks, named for that purpose by the issuer of the bond. The usual practice is for the bond holder to present a coupon bearing the same serial number as his bond, and representative of a certain term of payment, to one of these agencies and receive payment. The bank retains the coupon. Since these coupons may be cashed at any one of several different points, it is evident that in all probability the coupons will be widely distributed. One bank may have one hundred thousand variously numbered coupons; another bank may have fifty thousand more, and so on. After the term of payment for each set of coupons has elapsed, the several banks prepare reports adapted to show exactly which coupons were cashed at that particular bank, which were not, and how many coupons in all were presented for payment. Obviously, the preparation of such a report requires much detailed labor and the expenditure of a considerable amount of time, when done by hand.

The present invention is aimed at a means of mechanizing the preparation of this report by instituting a system of punched card accounting adapted to simplify and speed up the tabulation of the bond coupons. Under such a system, as soon as a coupon is presented to a bank and cashed, a record card is punched with the serial number of the coupon (which may be of six digits or less) and with a special control hole, which serves a purpose later to be explained. Then, when the term of payment has expired, all of the cards are assembled and run through a mechanical sorter which arranges them in sequential order. The cards are then ready to be placed in a tabulator, the card bearing the lowest serial number being the first to enter the machine. The card punching and sorting operations noted above are old and well known in the art and require no further discussion here. The cards on which the bond numbers are punched are of a standard 90-column Powers type, and in the present case each card may be divided into several separate fields, since one coupon is represented thereon by not more than six columns for the serial number and one column for the control hole. Thus the same cards may be used in the tabulation of several different reports. By way of a specific example the machine is disclosed herein as operating on serial numbers of six digits or less, but it should be understood that to operate on serial numbers containing a greater number of digits than six it would merely be necessary to increase the number of operating parts in the machine, and enlarge the separate fields of the cards.

The machine of the present invention is a modification of the usual Powers tabulator and, as previously mentioned, is adapted to tabulate serially numbered record cards according to the unbroken sequences contained therein. The actual operation of the machine may be briefly described as follows: There are three separably operable printing and accumulating units in the machine, and a special comparing unit operated and controlled in the same manner as the printing units. Each serial number is Y-wired into two of the printing and accumulating units and into the comparing unit simultaneously. Considering now the first number of a sequence, one of the above two printing units is caused to print the first number immediately after it is sensed. The other printing and accumulating unit accumulates but does not print the first number, while racks are set up in the comparing unit representative, digit by digit, of the first number. During subsequent machine operations, or as long as the serial numbers on the cards follow in sequential order, one digit only is accumulated in the second unit. The third unit is under the control of the aforementioned special control hole and accumulates one (1) each time a card is positively sensed. A detailed discussion of the construction and operation of the comparing unit will be entered into later in the specification. For the moment, it may merely be said that shortly after each card is sensed, and the number it represents transmitted to the head of the machine, its reading is compared, in the special comparing unit, with the reading of the preceding card. Unless each card follows its predecessor in exact consecutive order a total will automatically be tripped and the two accumulating units (second and third) be caused to clear and print their respective values. The second unit will print the number of the last card of a sequence while the third unit will print the total number of cards in the sequence. A standard type of designating mechanism is employed to control the printing hammers in order that the several units may effect printing only during their designated cycles. Other mechanism, standard in its operation and well known in the Powers machines, has been provided to permit an operation of the line space mechanism only upon total taking operations. Thus, the first number of a sequence, the last number and the total number of cards in the sequence appear on one line. The following sequence appears on the line below, and so on down the report sheet. The reader of the report is thus able to tell at a glance which coupons have been presented to that bank for payment and which have not—the latter is the difference between the last number of one sequence and the first number of the next sequence. A total of all the coupons is obtained simply by placing a specially perforated card into the machine, after the entire set of cards has been tabulated, to trip off grand total mechanism in the usual manner. The machine is provided with just one grand total accumulator and that is positioned in the rear of the machine associated with the third printing unit.

It should be understood that the machine of the invention is not limited to the use described above, but may be employed in any similar accounting work.

One object of my invention is to tabulate a group of serially numbered sequentially arranged record cards, according to the unbroken sequences found therein.

Another object of my invention is to obtain an individual total of the number of cards in separate consecutively numbered groups of cards and to obtain a grand total of all the cards in all of the groups.

Another object of my invention is to compare mechanically the serial numbers on a group of perforated record cards and automatically to initiate a total taking operation upon a break in the consecutive order of the serial numbers.

Another object of my invention is to combine the accumulating and comparing mechanisms, noted above, in a tabulator of generally standard Powers construction and to produce a report sheet comprising three printed columns of figures; the numbers in the first column to indicate the start of a new consecutive order; the numbers in the second column to indicate the last number of a consecutive order, while each number of the third column represents a total of the cards in their respective group. Thus, a complete tabulation of each group of cards is to be listed on one horizontal line.

Other objects and structural details of my invention will be apparent from the following description when read in connection with the accompanying drawings, wherein:

Fig. 4 is a general view in elevation of the left-hand side of the machine showing only the mechanism of the head;

Fig. 7 is a view in rear elevation of the translator illustrating the novel arrangement of wires and naught blocks associated therewith.

Fig. 8 is a fragmentary plan view of the naught blocks shown in Fig. 7.

Fig. 9 is a view in left-hand side elevation of the special comparing unit and the special sectors associated therewith.

Fig. 15 is a view in cross section of the special comparing unit with the right-hand frame plate removed.

Fig. 16 is a detailed isometric view showing the relative arrangement of a special sector rack and a special comparing rack.

Fig. 17 is a detailed front view of the rack advancing or counting pawls.

Fig. 18 is a detailed elevation view of the one cycle clutch mechanism.

Fig. 19 is a detailed position view showing a portion of the mechanism illustrated in Fig. 18.

Fig. 20 is a detailed view of a standard type designating device.

Figure 21:
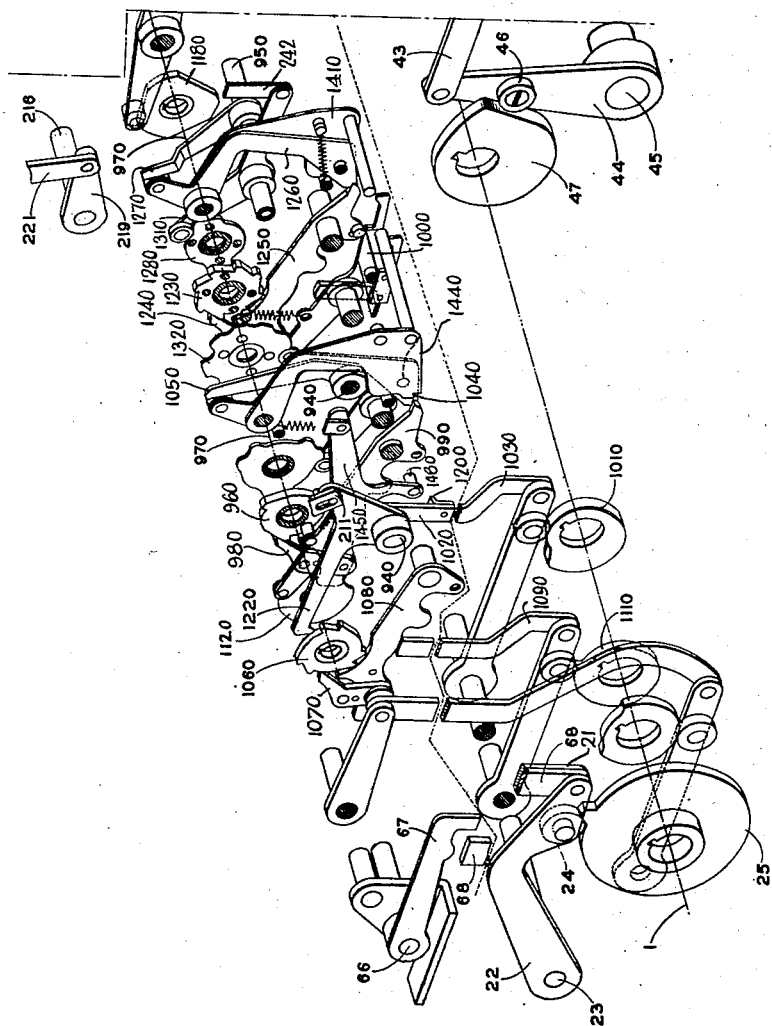

Figs. 21 and 22 when read together comprise a composite view in exploded isometric of the automatic total control mechanism.

Figure 1:
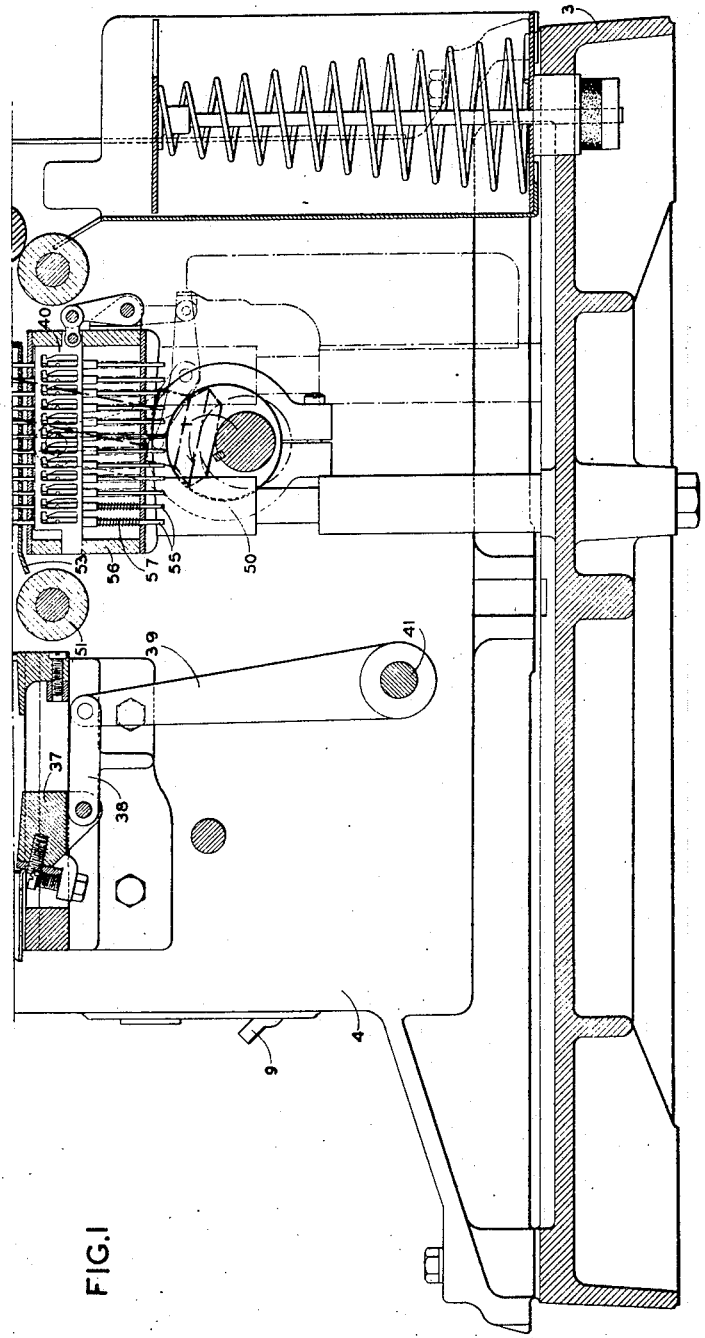
Fig. 1 is a view in cross section taken from the right-hand side of the machine through the base, showing a portion of the card feed and sensing mechanism.
Figures 3, 27:
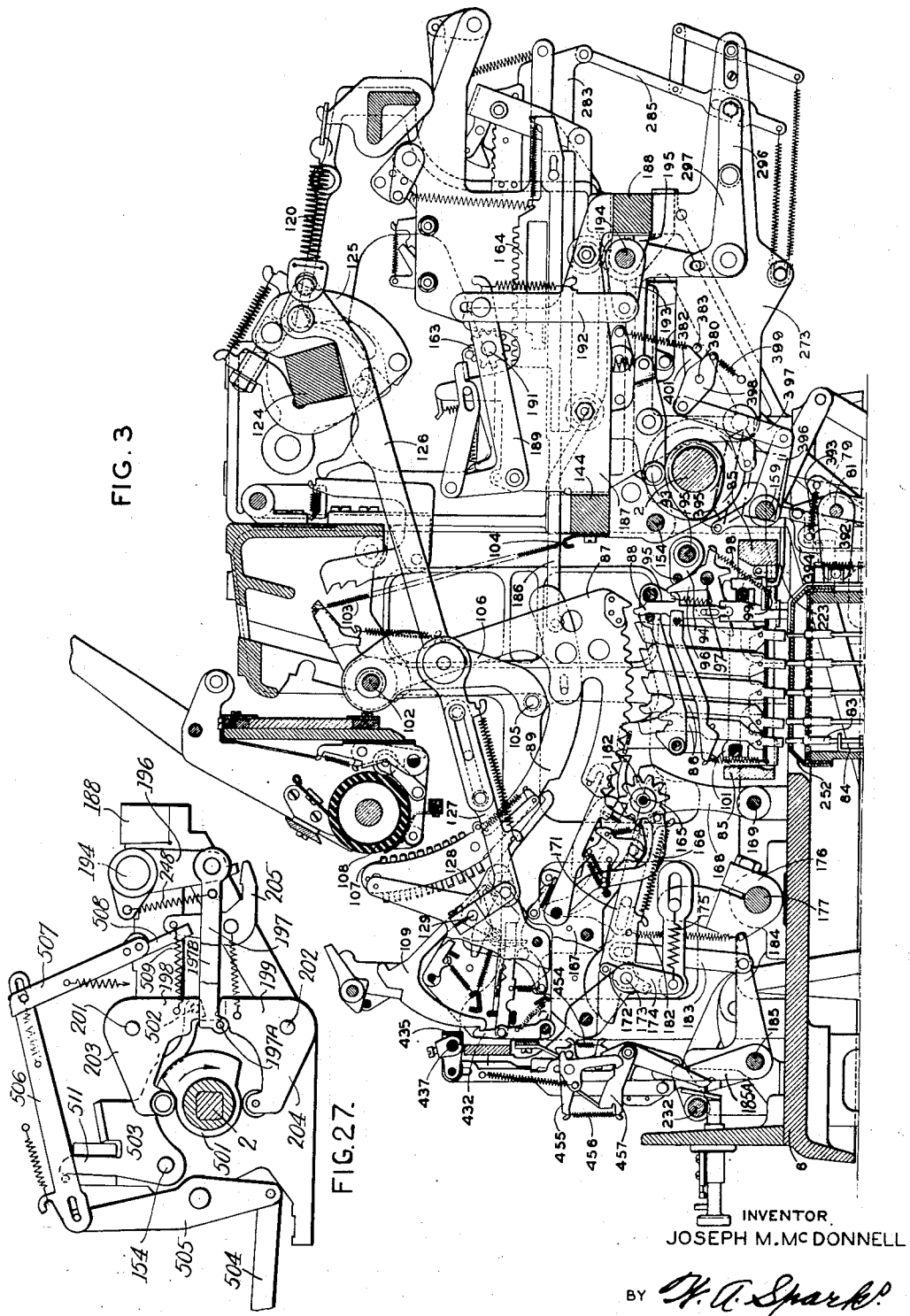
Fig. 3 is a view in cross section taken from the right-hand side of the machine, through the head, showing the recording and computing mechanisms and the position of the comparing unit in the machine.
Figure 6:
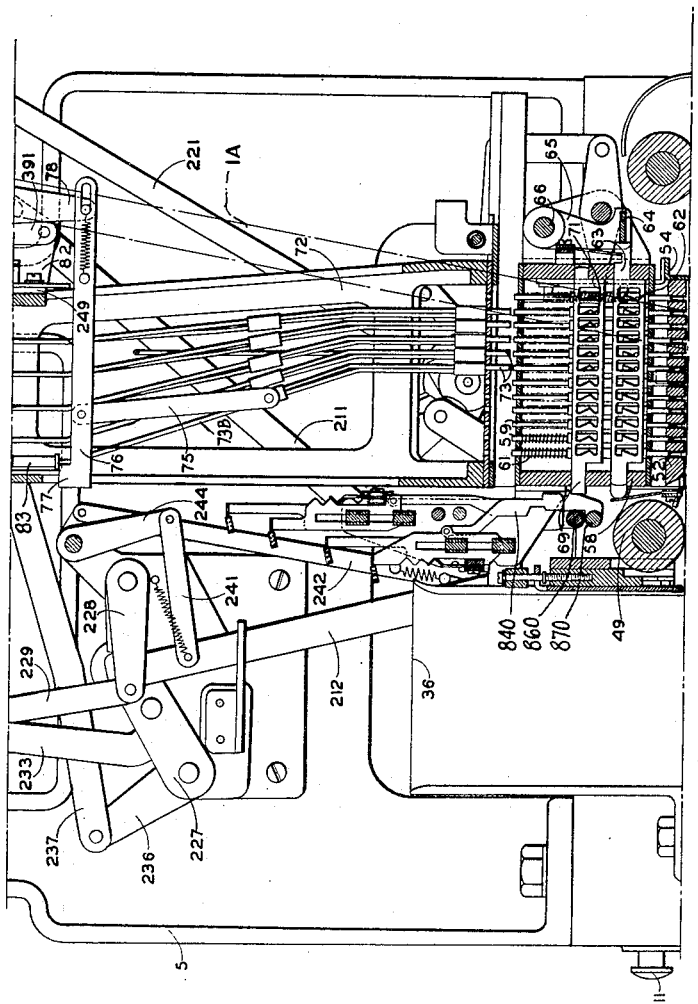
Fig. 6 is a view in right-hand cross section showing the intermediate section of the machine including the upper pin box and translator.

Fig. 23 is a diagram showing the arrangement of Figs. 1, 3 and 6 in a composite view.

Figure 2:
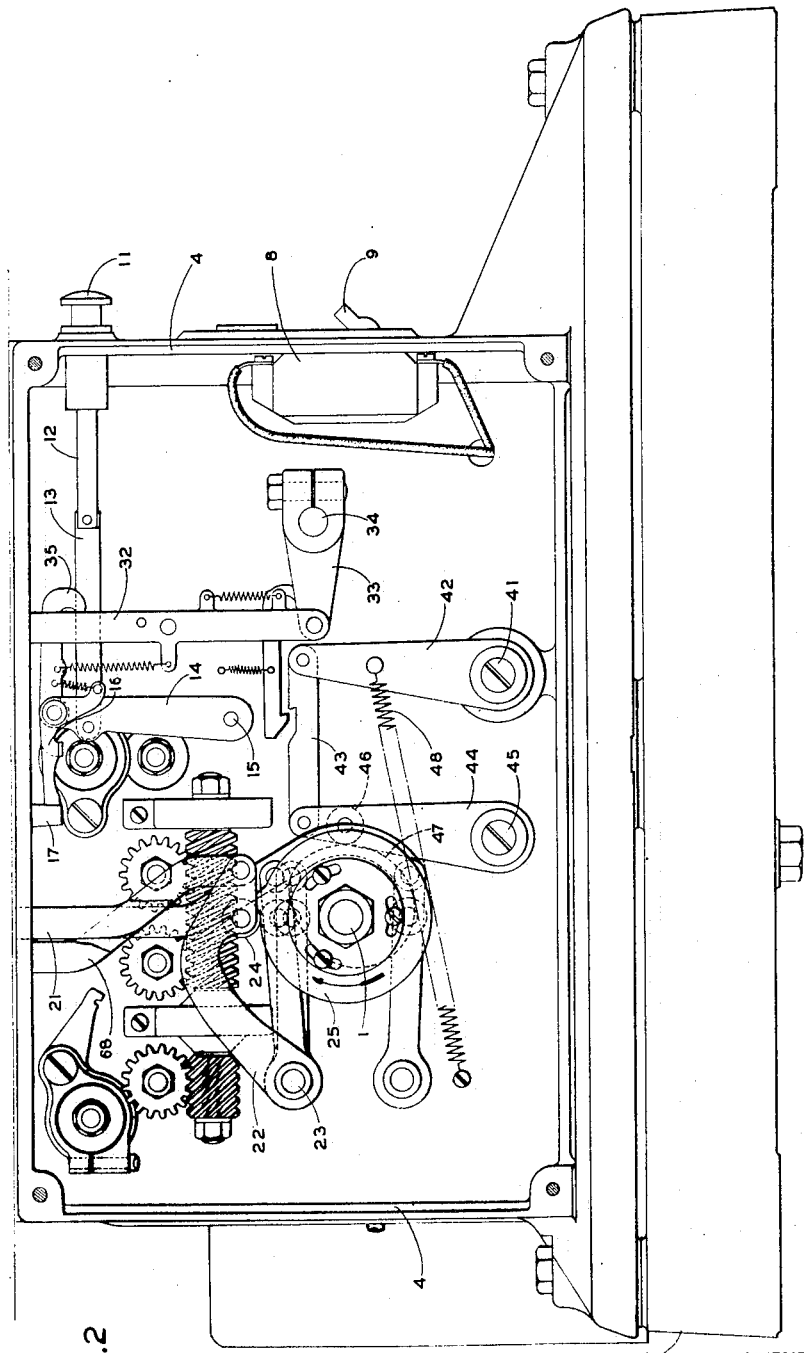
Fig. 2 is a view in elevation taken from the left-hand side of the machine, at the base, showing the stop start mechanism and the main cam shaft.
Figure 5:
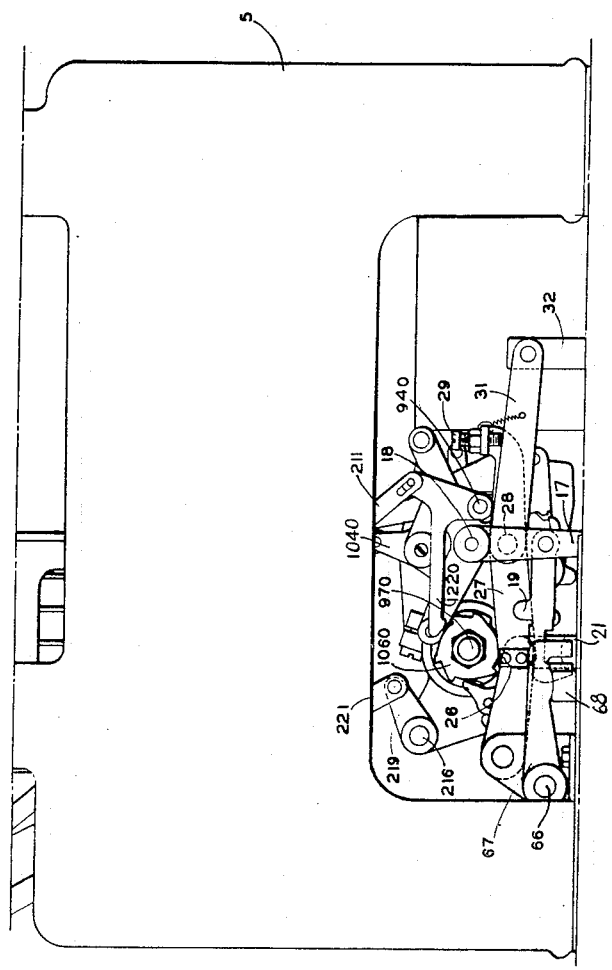
Fig. 5 is a view in left-hand side elevation of the intermediate section of the machine.

Fig. 24 is a diagram showing the arrangement of Figs. 2, 4 and 5 in a composite view.

Figure 26:
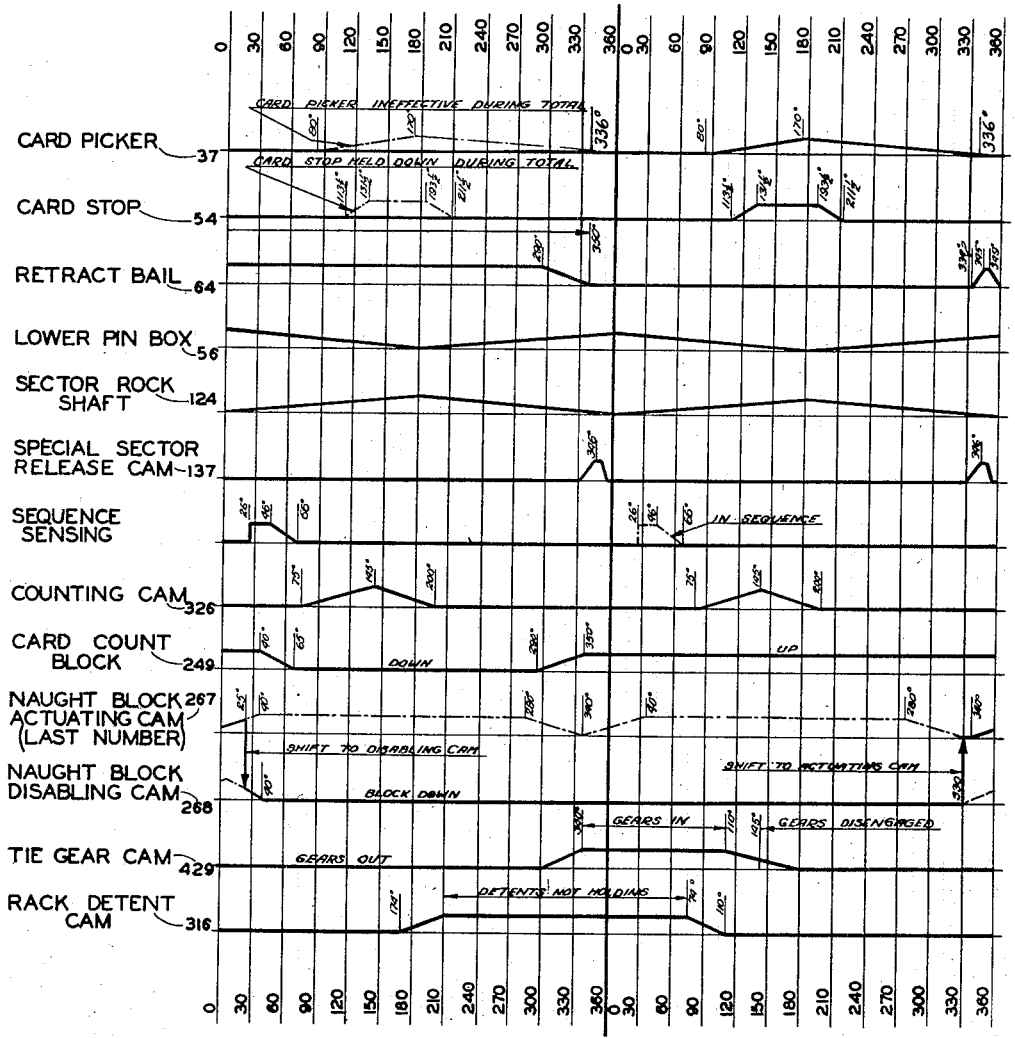

Figs. 25 and 26 are timing diagrams of the machine of the invention.

Fig. 27 is a detail view of certain mechanism for controlling the engagement and disengagement of the rear accumulator and its actuators.

Embodied in the present machine is an automatic total taking control unit, the operation of which is adapted to be initiated automatically upon a break in the consecutive order of the serial numbers. For purposes of brevity the act of automatically initiating an operation of this mechanism is frequently referred to in the structural description to follow as "tripping a total." Every occurrence of this phrase, or its equivalent, is intended to denote the automatic initiation of the total taking control mechanism. Also frequently used in the following description is the term "pivoted to" or "pivotally mounted on" to indicate that an element is loosely connected to another and is capable of movement relatively thereto. Therefore, every occurrence of the term "pivoted to," "pivotally mounted on," or the like will be understood to indicate that the connection mentioned is a loose one and that the parts involved may move relatively to each other.

MACHINE OPERATION

In the machine of the present invention the counting and comparing mechanisms are located in the head section of the machine where they cooperate in a manner later to be described with the usual accumulating and printing mechanisms also mounted therein. All of the head mechanisms are controlled directly from the base of the machine through the medium of perforated record cards adapted to be fed seriatim from a storage chamber into sensing position where they are analyzed and their respective readings transmitedt by rigid translator wires to the head of the machine.

With the exception of certain alterations in the timing and in the total control mechanism to be described later, the mechanism for feeding and analyzing the record cards is the same as that disclosed in the patent to William W. Lasker, No. 2,044,119, issued June 16, 1936. As disclosed in the above patent, and illustrated herein, the machine is power driven by an electric motor (not shown) and suitable gearing, leading directly from the motor, is employed to drive a main base shaft 1 (Figs. 1 and 2) and this motion is transmitted through a connecting drive shaft 1A (Figs. 1, 6, and 3) to a main head shaft 2. The shafts 1 and 2 are thus driven in synchronism and either the means shown or any other suitable driving connection may be used to obtain such synchronism of movement. The mechanism of the base is mounted on a heavy base plate 3 (Figs. 1 and 2) and is enclosed by frame plates 4, also mounted on the base plate 3. Intermediate frame plates 5 (Fig. 5) are fastened, at their lower ends, to the base frames 4 and are secured, at their upper ends, to a base casting 6 (Fig. 4) on which the various head mechanisms are mounted. Additional framework 7, which contributes to the support of the head mechanism, is mounted on the base plate 6 and the entire head section (except, of course, the printing platen) is enclosed by a light metal easily removable casing (not shown).

The previously mentioned electric motor is adapted to be switched on and off in a manner not herein shown through a switch box 8 (Fig. 2) and a manually operable lever 9 positioned at the front of the machine. A push button 11 is also provided at the front of the machine which is adapted when first pushed to engage a clutch similar to that shown in U. S. Patent 2,044,119 to Lasker, to permit the rotation of shafts 1 and 2. Subsequent operation of the button 11, while the machine is running, will disengage the clutch and stop the motion of shafts 1 and 2. The stop start mechanism of the present machine is an adaptation of similar mechanism disclosed in the Patent No. 2,044,119 and operates briefly as follows: The push button 11 is a part of a plunger 12 (Fig. 2) which extends rearwardly through the frame plate 4 and is connected to a rearwardly extending link 13 which is connected, in turn, to the upper end of a lever 14 pivoted at 15 to an inner frame plate 4. A suitably arranged spring (not shown) serves to retain the above linkage in the position shown in Fig. 2 with the push button 11 held outward. A rearwardly extending arm 16 is pivoted to the upper end of the lever 14. The rear end of the arm 16 is stepped in such a manner as to permit it to engage the lower end of a downwardly extending lever 17 secured to a rock shaft 18 (Fig. 5). Pivotally mounted on the lever 17, at about its mid point is a rearwardly extending arm 19 which has a notch cut in its lower front edge. Normally movable up and down in the notched portion of the arm 19 is a vertical link 21 connected at its lower end to an arm 22 pivoted at 23 to a stud on the inner frame piece 4. A roller 24 is mounted on the arm 22 and is constrained to follow the contour of a cam 25 secured to the main base shaft 1. The cam 25 is formed in such a manner as to elevate the arm 22 and link 21 once for every cycle of the machine. When the notched portion of arm 19 lies above the upper end of link 21 the motion of the said link is ineffective since it merely rises up and down in the notch. If, however, the arm 19 is caused to move rearwardly moving the notched portion of the arm out of the path of the rising link 21 then the link will engage the lower surface of the arm, causing it to rock upward in a clockwise direction (Fig. 5). Positioned directly above the rear end of the arm 19 is a lug 26 secured to one end of a two part lever 27 pivoted at its mid point to a stud 28 on the frame plate. The opposite or forward end of the lever 27 is formed with a bent-over portion through which extends an adjustable screw 29. The lower end of the screw 29 normally bears upon the upper edge of an arm 31 also pivoted to the stud 28. The forward end of the arm 31 is connected to the upper end of a downwardly extending link 32 connected at its lower end to an arm 33 secured to the shaft 34. The shaft 34 extends through the machine and mechanism shown in Patent No. 2,044,119 is provided at its other end to enable it to cause the engagement and disengagement of the previously mentioned machine clutch. With the mechanism in the position shown in Fig. 2, the clutch is disengaged. An arm 35 pivoted to the lever 14 is adapted to trip off certain toggle mechanism to cause the rotation of shaft 34 in a clockwise direction (Fig. 2) to engage the clutch, and so cause the rotation of the shafts 1 and 2. The pending application of Elmer H. Dreher, S. N. 69,570 (filed March 18, 1936) discloses stop start mechanism of a similar construction to that shown herein. A description of the toggle mechanism above referred to may be found therein. It will be apparent from the above description that any operation which causes the lever 17 to swing rearwardly will cause the disengagement of the machine clutch. This may be done manually by pressing the button 11, or through various automatic means for rocking the shaft 18.

Start-stop mechanism embodying the principle of operation expressed above has long been used in Powers tabulating machines and this mechanism forms no part, directly or indirectly, of the present invention. The start-stop mechanism briefly described herein is substantially the same as that shown in Figs. 15–18 of the Lasker Patent 2,044,119 and described therein on pages 2 and 3. The various automatic means for rocking the shaft 18, to stop the machine, are described in detail on page 3 of the above patent. The toggle mechanism, mentioned above, for holding the link 32 depressed, performs substantially the same function as the latch 48 of the Lasker patent and so far as the present invention is concerned it is immaterial which form of control is used.

CARD FEED AND SENSING

Referring now to Figs. 1 and 6, the storage chamber or card magazine is shown therein, indicated by the reference numeral 36. A stack of perforated record cards is adapted to be placed in the magazine 36 and a picker knife and block 37 is provided to eject the cards seriatim from the magazine and into position for sensing. The picker knife 37 is reciprocated through the base of the card magazine once for every cycle of the shaft 1 by a link 38, connected to the block, and an arm 39 connected at one end to the link 38 and at its other end to a shaft 41 supported between side frames 4 of the machine. As shown in Fig. 2 an upstanding arm 42 is secured to the left-hand end of the shaft 41 and is connected by a link 43 to another upstanding arm 44 pivoted at 45 to a stud on a frame 4. A roller 46, adapted to engage the periphery of a cam 47 on the shaft 1, is mounted on the upper surface of the arm 44 and a spring 48 tensioned between the arm 42 and a stud on the inner frame plate 4 normally serves to maintain the roller 46 in contact with the cam 47. The cam 47 is so formed as to cause the reciprocation of arm 44, and, therefore, the arm 42 and shaft 41, once for each cycle of the machine. Referring again to Figs. 1 and 6 it will be seen that the ejected card is fed between a pair of power driven feed rolls 49 and 51 and thereby into the sensing chamber comprised of a pair of perforated plates 52 and 53. As the card enters the sensing chamber it is picked up by a pair of spring tensioned rollers (not shown) and driven rearwardly until it comes to rest against a card stop 54. The card stop 54 is reciprocated vertically by a cam on the main shaft 1 once for every cycle of the machine to block the exit of the sensing chamber while the card is being sensed. The card stop mechanism used in the present machine is identical with that disclosed in the above mentioned patent and is illustrated in Fig. 21 thereof and described therein on page 6, lines 21-75, inclusive. The sensing of the card is performed by a plurality of pins 55 supported in a pin box 56. The pin box 56 is reciprocated vertically once for each cycle of the machine by an eccentric disk 50 mounted on the main shaft 1. There are forty-five columns of pins 55 and each column consists of twelve pins. Therefore, an entire card, whether it be of a 45 or 90-column type, may be sensed in one operation. Returning now to the card locked in the sensing chamber, it will be seen that the rising pins 55 will pass through their respective perforations in the lower chamber plate 53. Those pins 55 which find perforations in the card will continue to rise, passing through the card and into the upper chamber plate 52. Those pins which find no perforations merely press idly against the bottom of the card while the pin box 56 continues to rise against the tension of springs 57, one of which is provided for each pin 55. A locking slide 40 is provided to engage the elevated pins 55 and impart to them a positive elevating movement. Positioned directly above the sensing pin box 56 is an intermediate pin box 58 (Fig. 6) which supports intermediate pins 59 in equal number and arrangement to the sensing pins 55. The lower ends of the pins 59 lie directly over their respective pins 55 so that any positively elevated pin 55 will contact and elevate its associated pin 59 against the tension of springs 61, one of which surrounds each of the intermediate pins. Each of the pins 59 is provided with a lateral extrusion 62 adapted to cooperate with a spring-urged locking slide 63. Six of the pins 59 in each column have their extrusions 62 pointing in one direction, while the other six pins have their extrusions pointing in the opposite direction. Each set of six extrusions 62 is adapted to cooperate with a separate locking slide 63 so that either set of six pins 59 may be operated independently of the other set. The function of the locking slides 63 is to lock all of the elevated pins 59 and retain them in elevated position until the reading which they convey to the computing mechanism has been accumulated and printed. The slides 63 are retracted once for each cycle of the machine, to release the elevated pins 59, by a bail 64 supported at the rear of the slides by a pair of arms 65 (one shown) secured to a shaft 66. As shown in Figs. 2 and 5, an arm 67 is secured to the extreme left-hand end of the shaft 66 and positioned directly under the free end of the arm is a link or push rod 68 connected at its lower end to the previously mentioned arm 22. Elevation of arm 22 by cam 25, therefore, will elevate the arm 67 in a counter-clockwise direction (Fig. 2) to rotate its associated shaft 66 in the same direction and through the arms 65 thereon cause the retraction of the slides 63. The retraction of the slides 63 is a short spasmodic operation and occurs at a time when the sensing pins 55 are in their highest elevated position so that, if identical designation matter appears on two successive cards, the originally elevated pins 59 will not be permitted to descend. A second pair of slides 69 (Fig. 6) is associated with each column of pins 59 and is operated by extrusions 71 in a manner similar to the operation of slides 63 by extrusions 62. The slides 69, however, are not locking slides but may be called total trip or change of designation slides, since their only function is to sense a change in the designating number on the card and to initiate a total taking operation when such a change occurs.

TRANSLATOR (See Figs. 6, 7, and 8)

The numerical values represented by the upraised pins 59 are transmitted to the head section of the machine, where the counting and comparing operations occur, by means of the usual translator 72 in which is supported a plurality of rigid translator wires 73. As mentioned earlier in the specification the information punched on each card consists of one number of six digits or less and a special control hole which may be punched anywhere in the same field with the number, but which must appear in the same position for each set of cards. As shown in Figs. 6 and 7 each of the translator wires 73 is Y-wired into three different units of the machine. A wire 73A is joined to each wire 73 near its lower end and extends upward into the extreme right-hand unit indicated in Fig. 7 as Special comparing unit. Another wire 73B is joined to each wire 73 near its mid-point and this wire extends into the unit indicated as First number. The wire 73 itself extends into the Last number unit. The special control wire is indicated in Fig. 7 by the reference numeral 74 and is shown therein extending into the unit marked Total. For the sake of clearness of illustration only one wire 73 and associated wires 73A and 73B has been shown in Fig. 7 but it should be understood that in the entire translator there are six columns of wires 73 and each column consists of five wires. The elevation of any wire 73, therefore, will impart a corresponding upward movement to its associated wires 73A and 73B. Control wire 74 is raised simultaneously with the wires 73 so that a wire is elevated in all four of the above units at one time to accomplish a function later to be explained. As previously mentioned the present invention is mounted in a 90-column machine so that each column of five wires 73 is representative of the numbers 1, 3, 5, 7, and 9. As shown in Fig. 6, the nine wire of the first or units column of wires 73 terminates at the point where it is joined to wire 73B and an upwardly extending link 75 is pivoted to the joining point. The link 75 is connected, at its upper end, to a horizontal lever 76 extending transversely through the translator and formed with a toe 77 at its forward end. The rear end of the lever 76 is resiliently connected to the lower end of an arm 78 secured to a sleeve 79 loosely mounted on a shaft 81 pivotally supported between brackets 82 secured to the rear of the translator. The toe 77 of the lever 76 normally rests directly under a pin 83 guided in a bracket 84 (see Fig. 3) secured to the inside of the translator frame 72. The pin 83 is formed with shoulders which contact the upper edge of the bracket 84 to prevent the pin from descending farther than the position shown in Fig. 6. It will be seen, therefore, that, as long as the lever 76 retains the position shown in Fig. 6, the elevation of the nine wire of the first column of pins 73 will be imparted through link 75 and lever 76 to the pin 83 to elevate it in the usual manner to set up the proper digit stop. If, however, the sleeve 79 on the shaft 81 is rocked in a clockwise direction (Fig. 6) then the toe 77 on the lever 76 will be pushed forwardly to place it out of line with the pin 83. During the time the above condition prevails it is evident that upward movement of the nine wire 73 will not be imparted to the pin 83 so that the corresponding digit stop will not be set up. The disabling of lever 76 occurs immediately after the first card following a total taking operation has been sensed and serves a purpose later to be described.

STOP BASKET (*Figs. 3, 4, 5*)

The digit stops referred to above are arranged in the usual manner in the regular Powers type stop basket. A stop basket similar to the one employed herein is disclosed in the patent to Wm. W. Lasker 1,780,621, issued November 4, 1930. The present machine makes use of two stop baskets both mounted in a common frame or tray 85 (Fig. 3) supported between the side frames 7 of the head. One basket contains 25 columns of digit stops 86 and is adapted to limit the movement of the usual actuating sectors 87 associated with the three units—Total, Last number, and First number. The second stop basket is provided with just six columns of digit stops 86A (see Fig. 9) which act to limit the six special sectors 87A of the comparing unit. Referring now to Fig. 3 each column of digit stops 86 is formed of five independently movable digit stops or bars and a normally ineffective zero stop 88. The digit stops 86 operate to limit the movement of sectors 87 and thereby position the type sectors 89, secured to the sectors 87 in substantially the same manner as disclosed in the Lasker Patent 1,780,621. An innovation has been made, however, in the zero stop mechanism which now operates as follows: As shown in Fig. 4 a cam 90 is secured to the main head shaft 2 near its left-hand end. Cooperating with the cam 90 is a roller 91 on one end of an arm 92 secured to the left-hand end of a shaft 93 supported between the side frames 7 of the head. When the machine is at normal the cam 90 is resting in the position shown in Fig. 4 with its high point directly beneath the roller 91. Secured to the shaft 93 directly behind the first mentioned or standard stop basket is a pair of arms 94 (Fig. 3) (one shown) which support between them a bail 95. The bail 95 bears against, and normally holds rocked, one arm each of a plurality of bell-crank levers 96 pivotally mounted on a cross shaft 97, each lever 96 being resiliently connected to the lower end of one of the zero stops 88. The position assumed by the above mechanism in Figs. 3 and 4 is its normal position and, as long as the high point of the cam 90 remains under the roller 91, all of the zero stops 88 will remain depressed. However, as soon as the machine clutch is engaged and the shaft 2 begins to rotate (counter-clockwise as viewed in Fig. 4) it is evident that the high point of cam 90 will pass from under the roller 91 thus relieving the pressure exerted by bail 95 and permitting springs 98, one of which is tensioned between an arm of each bell-crank 96 and a fixed guide plate 99, to rotate the bell-cranks 96 clockwise to elevate their respective zero stops into effective retaining position to prevent their sectors 87 and 89 from going forward. In all of those columns of stops, however, in which one or two bars 86 have been raised, the usual slide 101 is cammed rearwardly, before the shaft 93 is released, to engage a toe on the bell-crank 96 and so prevent it from rocking upward to raise the zero stop. The sector 87 of that column is thus free to move forward and limit against the elevated stop 86. As shown in Fig. 9 similar zero stops 88A are provided for the special comparing sectors and a separate pair of arms 94 is secured to the shaft 93 directly behind the unit to rock the bell-cranks 96A. The shaft 93 is adapted to be held rocked in disabling position during total cycles, in a manner described under the heading "Total taking control mechanism," in order that all of the sectors 89 may be free to move forward.

PRINTING MECHANISM

Figure 10:
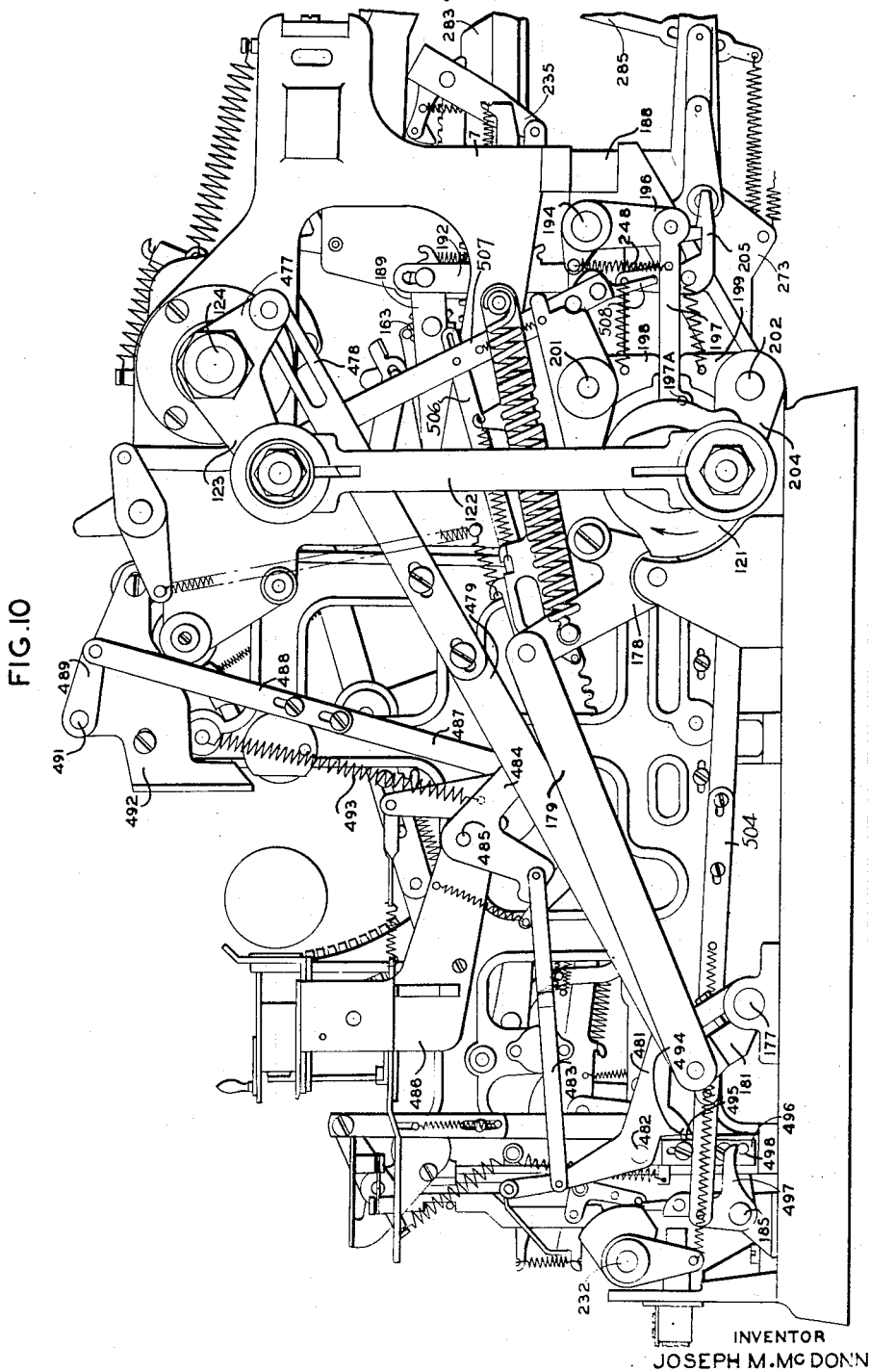
Fig. 10 is a general view in right-hand side elevation of the head section of the machine.

The actuating sectors 87 and the type sectors 89 are all pivoted to a shaft 102 (Fig. 3) pivotally supported between the right-hand frame piece 7 and a bracket (not shown) dependent from an auxiliary top frame member 7. A spring 103, tensioned between a rear extension of each type sector 89 and a fixed spring anchor 104, tends to swing the type sectors 89 and their associated actuating sectors 87 upward in a clockwise direction (Fig. 3) about the shaft 102. The sectors, however, are constrained to follow the movement of a bail 105 which is supported between the lower ends of a pair of arms 106 (one shown) secured to the shaft 102. The bail 105 normally holds the sectors 87 and 89 retracted against the tension of springs 103 and it is moved forwardly once for each cycle of the shaft 2 to permit all of the sectors which are not retained by zero stops 88 to follow and position their type elements 107 to effect printing against the platen 108. On the return stroke of bail 105 all of the sectors 87 and 89 are picked up and restored to normal against the tension of springs 103. The type elements 107 are struck by hammers 109 released and operated in a manner well known in this type of machine. Certain actuating mechanism for operating the restoring bail 105 and for releasing the hammers 109 is shown in Figs. 3 and 10 and is driven from the main head shaft 2. Referring to Fig. 10 a cam 121 is secured to the right-hand end of the shaft 2 and a pitman 122 is pivotally connected, at one end, to the outside face of the cam 121 and at its other end to one arm 123 of a bell-crank lever secured to a shaft 124. Rotation of the shaft 2, therefore, will impart a reciprocable rocking motion to the shaft 124 once for each cycle of the shaft 2 through pitman 122. The driving mechanism employed herein is the same as that used in the usual Powers machines and comprises generally a slotted lever 125 (see Fig. 3) secured to the shaft 124 and to which is connected a long forwardly extending link 126 connected to one of the arms 106 and, by means of the resilient extension 127, to an arm 128 on a shaft 129 of the hammer release mechanism. During the first 180° of rotation of the shaft 2 the shaft 124 is rocked in a clockwise direction (Figs. 3 and 10) and the link 126 is driven forwardly to rock the bail 105 upwardly and to rock the shaft 129 in a clockwise direction, thus releasing the printing hammers 109. During the second 180° of rotation of the shaft 2, the shaft 124 is rocked in a counter-clockwise direction thus permitting the heavy spring 120 to return the operating link 126, thereby restoring the bail 105 and the shaft 129 both to normal. The oscillation of shaft 124 occurs once for every cycle of the machine but, as previously explained, the release of the type sectors is contingent upon the elevation of the digit stops 86, or the operation of the total taking mechanism. If all of the type sectors are held in the zero position none of the printing hammers 109 will be released, since the hammers must be conditioned for operation by a moving type sector 89 as is well known in the art. The type sectors 89 are normally positioned with their first or zero printing element 107 just below the printing line and the distance travelled by the sector as it moves from completely retracted position to the point where it contacts the zero stop 88 is sufficient to align the zero element 107 in printing position.

The mechanism shown in Fig. 3 hereof for releasing the printing hammers 109 is substantially the same means that has long been used in the Powers machines. The patent to W. W. Lasker, No. 2,066,407, issued January 5, 1937, discloses a hammer release mechanism which is identical in all its essential features to that shown herein. In Fig. 2 of that patent, the shaft 118 thereof is the equivalent of the shaft 129 mentioned herein.

RELEASE AND RESTORATION OF SPECIAL SECTORS

Figure 12:
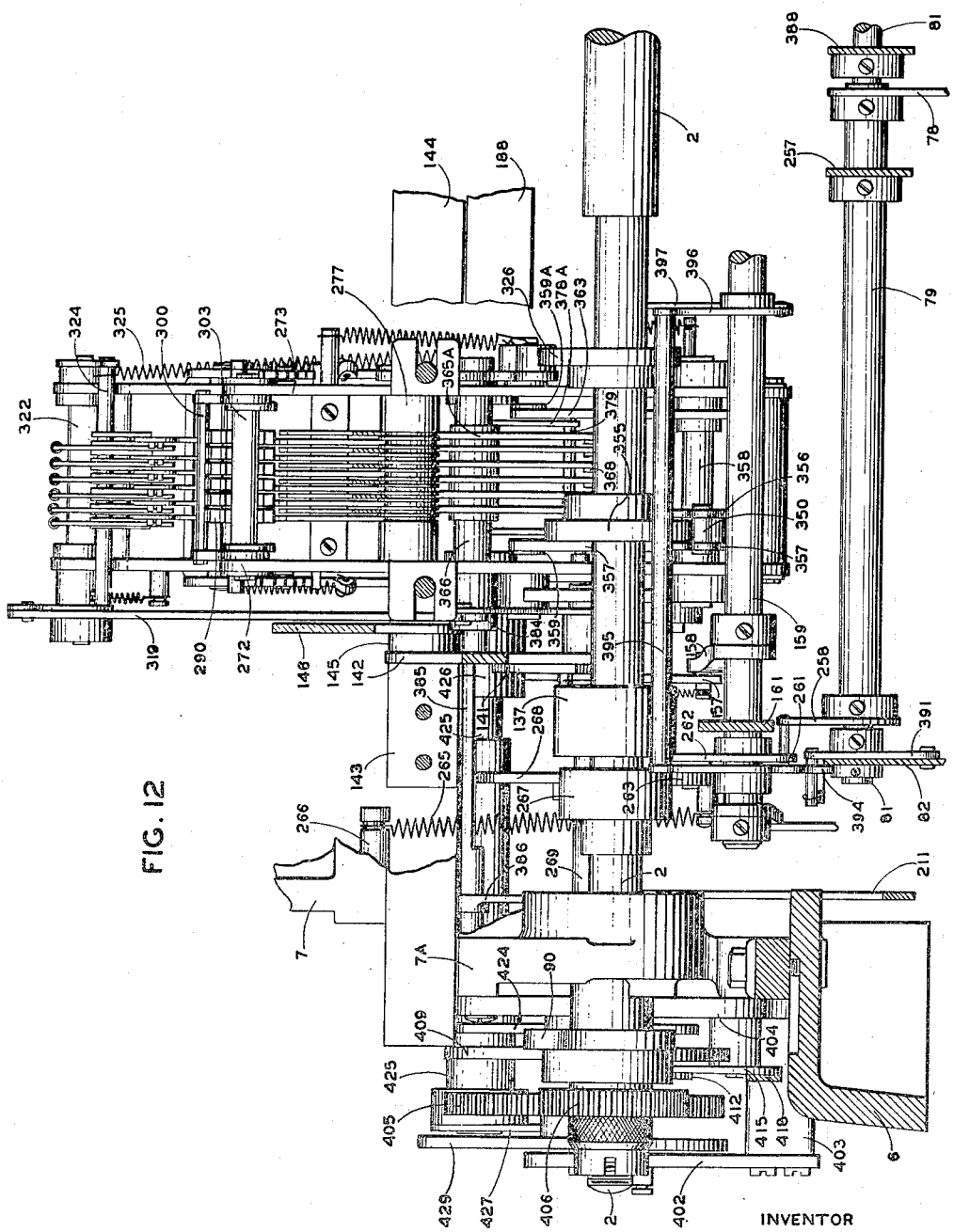
Fig. 12 is a detailed sectional view looking towards the rear of the machine, taken just in front of the main head shaft and showing the front of the comparing unit and the associated cams and shafts operable therewith.

The sectors 87A (Fig. 9) of the special comparing unit are pivoted to a shaft 102A which is an individually operable extension of the shaft 102 and is supported between the previously mentioned dependent bracket (not shown) and the left-hand frame member 7. These special sectors operate merely as a positioning medium to set the previously mentioned comparing racks and there is, therefore, no printing mechanism associated with this unit. The sectors 87A are independently controlled by zero stops 88A in the same manner as the previously described 25-column unit and are normally held in retracted position against the tension of springs 103 by a plurality of hooks or latches 131 (one for each sector) which engage lugs 132, one of which is secured to the side of each sector 87A. The hooks 131 constitute a singly operable unit formed integrally with a block 133 pivotally supported between a pair of arms 134 (one shown) secured to the shaft 102A. A rearwardly extending link 135 is pivotally connected at its front end to the left-hand arm 134 and resiliently connected at its rear end to another link 136 operated in the previously described manner by a lever 125 secured to the shaft 124 and another spring 120. Arms 134, block 133 and hooks 131, therefore, are moved forwardly and returned in unison with the restoring bail 105 which, as previously described, controls the movement of the sectors 87 and 89 of the 25-column printing unit. However, for reasons which will be more apparent later in the description, mechanism is provided for disabling the hooks 131 almost immediately after the main head shaft 2 begins to rotate in order that the sectors 87A may advance under tension of their individual springs 103 a considerable time before the printing sectors 89 leave their normal position. As shown in Figs. 9 and 12 a cam 137 is secured to the shaft 2 behind and slightly to the left of the 6 column comparing unit. The cam 137 is formed with one abrupt rise 138 adapted to cooperate with a stud 139 integral with a lever 141 pivotally mounted on the lower end of an arm 142 pivoted at its upper end to a bracket 143 secured to a fixed cross bar 144. The cross bar 144 is rigidly supported between the side frames 7. Secured to the arm 142 by means of a laterally extending collar 145, is an upwardly extending lever 146, through the turned over upper end of which is passed an adjustable set screw 147. The lower end of the set screw 147 normally rests on the upper rear edge of an arm 148 fast to a stud 149 formed integrally with the block 133. The previously mentioned lever 141 has cut in its lower edge a shoulder 151 adapted to cooperate with a pin 152 on the lowermost portion of the arm 142. In tracing the operation of the above linkage it will be seen that as the shaft 2 begins to rotate (counter-clockwise as viewed in Fig. 9) the rise 138 thereon will pass under the pin 139 forcing the lever 141 in a clockwise direction to rock the arm 142 also in a clockwise direction through shoulder 151 and pin 152. Continuing the motion it is evident that clockwise rotation of the arm 142 will rock the lever 146 in the same direction to depress the arm 148, thus rocking the block 133 and its hooks 131 upward in a counter-clockwise direction to free the sectors 87A. All of the sectors 87A, therefore, which are not retained in normal position by upraised zero stops 88A, will immediately fly forward to their several positions as determined by their respective column of digit stops 86A. After the rise 138 has passed completely under the pin 139 a spring 153, tensioned between an upstanding arm of the lever 141 and a cross shaft 154, serves to return the assembly comprising members 141, 142, and 146 to normal.

A short forward extension 155 of the arm 142 limits against the underside of the cross bar 144 to prevent an overthrow of the above assembly by spring 153. The assembly comprising arm 148, block 133 and hooks 131 is restored to normal simultaneously with the restoration of lever 146 by a spring 156 tensioned between the arm 148 and a stud on the previously mentioned operating link 135. As the hooks 131 return to latching position their lower front edges will come to rest on the tops of the lugs 132 and will remain in that position until the arms 134 begin to move forward under the propulsion of links 135 and 136. The hooks 131 will, of course, move forward with the arms 134 and at some point during this forward movement the engaging shoulders formed in the hooks 131 will drop down to the front of the lugs 132. Now, as the shaft 124 starts its return reciprocatory motion, the special sectors 87A and the sectors 87 and 89 of the printing unit will all be restored together to their normal retracted position. As long as the lever 141 remains in a position wherein its pin 139 may be contacted by the rise 138 on the cam 137, it is evident that an operation like the one described above will occur once for every revolution of the shaft 2. As shown in Fig. 9 there is provided, however, certain disabling mechanism operable only during the blank stroke which precedes a total cycle, for preventing the release of the special sectors 87A during the total cycle.

A link 157 is pivotally connected, at its upper end, to the rear end of the lever 141 and is resiliently connected, at its lower end, to a rearwardly extending lever 158 secured to a shaft 159 pivotally mounted in brackets 161 (see Figs. 9, 11 and 12) secured to the rear of the stop tray 85. The shaft 159 is a rock shaft actuated only during the blank stroke preceding a total cycle in a manner described under the heading "Total taking control mechanism". It is apparent that a counter-clockwise rocking motion of the shaft 159 will cause the lever 141 to pivot also in a counter-clockwise direction, through lever 158 and link 157, to elevate the pin 139 out of the path of rise 138 and so render the cam 137 ineffective to trip the sector release mechanism. In order to clarify further the operation of the sector trip mechanism, it may be stated that at the time the lever 141 is disabled the sectors 87A are entirely forward but the type sectors 87 have not yet begun to move from normal. When the sectors 87A are restored near the end of the blank cycle, the lever 141 is still disabled and the rise 138 on the cam 137 passes ineffectively beneath the stud 139. Shortly after the rise 138 has passed beyond its operating position, the lever 141 is permitted to return to normal and in position for operation by the cam 137 at the end of the total cycle. Mechanism, described under the heading "Total taking control mechanism", is provided for insuring the retention of the sectors 87 and 89 in normal position during the blank cycle.

Accumulating Mechanism

As previously stated, there is no printing or accumulating mechanism associated with the special comparing unit. In the 25-column printing unit, however, there is provided a front accumulator comprising a single set of wheels 162 (Fig. 3) operable by the actuating sectors 87 in a manner well known in the Powers tabulating machine. Associated with the last six denominational orders on the right-hand side of the printing unit is a rear accumulator comprising six accumulator wheels 163 and their actuating racks 164. In the present machine the front accumulator is employed to register totals only and the rear accumulator registers grand totals only. Before proceeding further in the description of the accumulating mechanism it may be well to make a general restatement of the position and function of the several separate units in the 25-column printing unit. Beginning from left to right in the unit the first six denominational orders are operated by the translator wires 73B and are required to print only the first number after a total. In all other operations including the total taking operation the printing hammers are prevented from being released, by means described under the heading "Designating mechanism" so that any accumulating or total taking operations performed in this unit are superfluous and ineffective. In order that the columns may be properly spaced on the ledger sheet a few orders are skipped after the First number unit and then come six more significant orders operated by the translator wires 73. This unit accumulates, but is allowed to print only during total taking cycles. Through means later to be described the first number following a total will be accumulated but not printed in this unit and for each machine cycle thereafter during the time the machine remains in sequence, one digit (1) will be accumulated in this unit. Now, when a total is tripped, through a break in sequence, the second unit will have accumulated the entire first number plus one for each card that followed in sequential order so that the total printed will be the same number as that represented on the last card to remain in sequence, hence the name, Last number unit. After skipping a few more orders we come to the last six significant orders. This unit is controlled by the special wire 74 and is adapted to print only during total taking operations and to accumulate one digit (1) for each machine cycle as long as the cards follow in sequential order. The third unit, therefore, prints the total number of cards in each sequence. As noted above a grand total accumulator is associated with the last mentioned Total unit in order that a final total may be had of all the cards in one set. The present invention does not require a novel operation of the accumulating mechanism so that both the total and grand total accumulators may be the same as the accumulators disclosed in numerous patents and previous applications dealing with the Powers type tabulator. The accumulating mechanism shown and described herein is, however, generally similar to that shown in the Lasker U. S. Patent No. 2,151,406, issued March 21, 1939. Briefly, the front accumulator wheels 162 (Fig. 3) are freely mounted on a shaft 165 supported between a pair of arms 166 (one shown) pivoted to a fixed frame piece 167. The shaft 165 is engaged at either end by slotted cam arms 168 secured to respective ends of a short shaft 169. A forwardly extending link 171 is connected to the upper end of the left-hand cam arm 168 and is slidably supported in any suitable manner at its forward end. The link 171 has a pair of oppositely disposed notches cut in its upper and lower edges near the link's forward end, which notches are adapted to cooperate with a pair of pins formed in opposite ends of a rock lever 172 secured to a shaft 173. An arm 174 also secured to the shaft 173 is connected at its lower end to a link 175 operable by a lever 176 fast on a shaft 177. A spring extends between a pin on link 175 and a pin on link 176. The shaft 177 is a rock shaft adapted to be reciprocated once for each cycle of the main head shaft 2 through the cam 121 secured to shaft 2, (see Fig. 10) a lever 178 operable by cam 121, a forwardly extending link 179 connected to the lever 178 and an arm 181 connected to the link 179 and secured to the right-hand end of the shaft 177. Referring again to Fig. 3 it is evident that the motion of shaft 177 is transmitted through the pin carrying lever 172 and link 171 to the cam arms 168 causing them to rock with the shaft 177 to move the wheels 162 into and out of mesh with their respective racks 87. The time of reciprocation of the cam arms 168 is determined by the position of the link 171 and which of the oppositely disposed notches cut therein is in effective cooperation with the lever 172. Mechanism is provided for shifting the link 171 during total cycles including spring 182, link 183 and a lever 184 pivotally mounted on a rock shaft 185. An arm 185A is secured to the shaft 185 and is adapted, when the shaft is rocked, to depress the lever 184 and pull down the link 171, through spring 182. The rock shaft 185 is sometimes called the front total shaft of the machine, since it is adapted to be rocked only during total cycles. The means for rocking the shaft 185 are old and well known in this type of machine and will be described under the later heading "Total taking control mechanism".

Considering now the grand total mechanism, as shown in Fig. 3 each actuating rack 164 is connected directly to an associated type sector 89 by a link 186. A pair of frame plates 187 (one shown) is secured to two fixed cross bars, namely, the previously mentioned bar 144 and another bar 188 positioned farther rearward. Mechanism is supported between the plates for guiding the racks 164, and a pair of arms 189 (one shown), pivoted to the frame pieces 187, support a shaft 191 on which the wheels 163 are mounted. Resiliently connected to the rearmost end of each arm 189 is a downwardly extending link 192 (one shown) connected at its lower end to an arm 193 (one shown) secured to a shaft 194. As shown in Figs. 3 and 10 the shaft 194 is loosely supported by a bracket 195, dependent from the cross bar 188 immediately behind the grand total unit, and the right-hand frame member 7. The shaft extends slightly beyond the frame 7 and has a downwardly extending arm 196 (see Figs. 10 and 27) secured to its outer end. The lower end of the arm 196 is connected to a forwardly extending link 197 bearing a stud 197A at its forward end adapted to cooperate with either arm 198 or arm 199 of a pair of bell-crank levers pivoted at 201 and 202 to studs on the frame 7. As shown in Fig. 27, there is a second link 197B directly beside the link 197, or behind it as viewed in Fig. 27, which link is also pivoted to the lower end of arm 196 and is connected at its forward end to the link 197 by means of the stud 197A. The arms 198 and 199 are positioned between these links 197 and 197B. The bell-crank levers of which each of the arms 198 and 199 form a part are also formed with respective forwardly extending arms 203 and 204 cooperable with a cam 501 fast on the constantly rotating shaft 2. The shaft 2 rotates in a clockwise direction, as viewed in Fig. 27, and the cam 501 is so formed as to impart successive rocking motions, first to the lever 199—204 and then to the lever 198—203, once for each cycle of the shaft 2. It will be seen that the lever 199—204 will be rocked shortly after the start of each machine cycle and will be released approximately midway in the cycle. Immediately after the release of lever 199—204 the lever 198—203 is operated and then at the end of the machine cycle this lever is released and the cam 501 occupies the position shown in Fig. 27. Each of the arms 198 and 199 is adapted to engage the stud 197A but it will be seen that only one of these arms may engage the stud at one time. A spring 248 tensioned between the link 197 and an arm fixed to the shaft 194 serves to urge the assembly 197, 197A and 197B upward into cooperative relation with the arm 198 but, as is indicated in the drawing, the assembly is normally held downward in cooperative relation with the arm 199. The means for holding the assembly 197, 197A and 197B downward resides in a stud 502 overlying the link 197B, which stud is formed on the rear end of a lever 503 secured to the right-hand end of the previously mentioned shaft 154.

During normal adding operations of the machine, the rear accumulator wheels 163 stand engaged at the start of each machine cycle but before the racks 164 start forward, the bell-crank lever 199—204 is rocked by cam 501 to pull the links 197 and 197B forwardly and rock the shaft 194 in a clockwise direction (Fig. 3) to shift the wheels 163 to disengaged position. The racks 164 are thus free to advance without disturbing the wheels 163 and midway in the cycle the lever 199—204 is released thereby permitting the wheels 163 to drop to engaged position and receive a registration determined by the extent of movement required for the racks 164 to return to normal position. The rear accumulator functions in the above manner during each adding operation of the machine. As previously mentioned, totals are taken from the front accumulator wheels 162. Therefore, it is evident that during total taking operations, the timing of the rear accumulator must be changed in order that the total taken from the front accumulator will not be entered into the rear wheels. Therefore, there is provided, as is shown in Fig. 10, an arm 497 fast on the right-hand end of the total shaft 185. A rearwardly extending, two part link 504 is connected at its forward end to the arm 497 and at its rear end to the lower end of a lever 505 (Fig. 27) pivoted near its midpoint to the framework of the machine. The upper end of the lever 505 is connected by a pin and slot to a link 506 which is, in turn, connected to another and downwardly extending link 507. A finger 508 is fixed to the lower end of the link 507 and this finger engages a laterally extending pin on a latch 205 pivoted to the framework of the machine. The latch 205 is adapted to engage a downwardly extending toe of the arm 196 and is urged in a counter-clockwise direction into engaging position by means of a spring 509. During adding operation the latch is held in the disengaged position shown in Fig. 27 by means of the finger 508. It will be seen, however, that as the shaft 185 is rocked, to cause the total to be taken from the front accumulator this motion (clockwise as viewed in Fig. 10) will be imparted through arm 497, link 504, lever 505 and link 506 to the link 507 and finger 508, to move these elements forwardly away from the latch 205, thereby permitting the latch to rock in a counter-clockwise direction under the action of spring 509. The shaft 185 is rocked at approximately the start of a machine cycle so that the freeing of latch 205 takes place just before the arm 196 and shaft 194 are rocked through lever 199—204 to disengage the rear accumulator wheels 163. Thus at this time the latch 205 limits against the toe of arm 196. As soon as the lever 199—204 is rocked by the cam 501, however, the arm 196 is swung forward and the latch 205 engages the toe thereof to retain the arm and the shaft 194 rocked and the wheels 163 in disengaged position. Thus, although the lever 199—204 is released midway in the total cycle, the wheels will be held disengaged throughout the entire cycle.

The wheels 163 thus accumulate the grand total and are cleared during a grand total taking operation. Through means described under the heading "Total taking control mechanism," the previously mentioned shaft 154 is rocked at the start of a grand total taking operation and is held rocked for the duration of the grand total cycle. Referring to Fig. 27, the direction of motion of the shaft 154 as it rocks from normal position is counter-clockwise and it will be seen that the lever 503 will rock with the shaft out of its normal position and permit the assembly 197, 197A and 197B to move upward under the tension of spring 248 into cooperative relation with the arm 198. Now, when shortly after the start of this cycle the lever 199—204 is rocked, its motion will be ineffective and the wheels 163 will remain engaged with the racks 164 so that when the racks are permitted to advance they will reset the wheels to zero and position the type carriers 89 in accordance with such resetting. Approximately midway in the cycle and before the racks 164 begin their return movement the lever 198—203 is rocked by the cam 501 to operate the link 197 and shift the wheels 163 to disengaged position where they are held throughout the remainder of the cycle. The lever 503 is also effective, through an arm 511 thereof, to operate the link 506 and link 507 so that the latch 205 retains the wheels 163 in disengaged position at the end of the grand total cycle (see Fig. 10).

TOTAL TAKING CONTROL MECHANISM

In all of the Powers tabulators of the later type there is provided an automatic total control unit which initiates both total and grand total operations from a change in designating number or through any other suitable means made necessary by the particular function performed by each machine. A total control unit similar to the one employed herein is described in the U. S. Patent to John T. Ferry, No. 2,185,841, issued January 2, 1940. Figs. 5, 6, 11, 21, and 22 of the present application illustrate various portions of the automatic total control mechanism. Figs. 3 and 4 of the above patents and Figs. 21 and 22 of the present application are comparable views illustrating the same subject matter. As explained in the description of the timing diagram to follow, the present machine trips a total at a point slightly later in the machine cycle than is customary in the standard Powers tabulator. To compensate for this change in timing certain minor alterations in some of the cams of the total unit and in the card feed cam 47 have been made. In addition to the cam 47 these changes include a re-design of the retract cam 1330 (Fig. 22 hereof) shown in Fig. 4 of the above application and indicated therein at 133; the addition of a new cam 1150 for operating the card stop; and in repositioning one of the total cams 1010 (Fig. 21 hereof) indicated as 101 in Fig. 3 of the previous application. The function, purpose and general construction of the automatic total taking control mechanism in the present machine is, however, the same as that described in the above patent. In the brief description to follow, each member is given the same reference numeral, except for the addition of a zero, by which it is designated in the above patent. As illustrated in Figs. 21 and 22 hereof, the automatic total control mechanism comprises a normally inactive cam and ratchet unit which operates under the control of two cams 1110 and 1010 (Fig. 21) fast on the main cam shaft 1. The cam 1110 operates a vertical push rod 1090 which, in turn, raises and lowers a pivoted arm 1080 on which is mounted a feed pawl 1070. Operable by the feed pawl 1070 is a ratchet wheel 1060 keyed to a shaft 970 which supports all of the cams of the total control unit. The cam 1010 operates a forked vertical push rod 1030, the separate branches 1020 and 1200 of which are adapted to raise and lower respective pivoted arms 990 and 1250. Mounted on the arm 990 is a feed pawl 980 adapted to engage and advance another ratchet wheel 960 also keyed to the shaft 970. A feed pawl 1240 on the arm 1250 is adapted to operate a third ratchet wheel 1230, which wheel is loosely mounted on the shaft 970. In the normal inactive position of the unit the feed pawl 1070 moves in a blank space between the three pairs of teeth with which this wheel is formed so that although the arm 1080 is raised and lowered once for each cycle of shaft 1, its motion is ineffective. The arms 990 and 1250 are normally held upward, out of the path of movement of push rod 1030 by means of respective latches 1040 and 1260. Adapted to disable the latch 1040 is an arm 1050 fast on a shaft 940. When the shaft 940 is rocked the latch 1040 is disabled permitting the arm 990 to drop downward on to the top of branch 1020 of push rod 1030. The disabling of latch 1040 occurs at a predetermined point in the machine cycle and immediately after such disabling operation the arm 990 is again raised under the control of cam 1010, and, through its feed pawl 980, advances the ratchet wheel 960 and shaft 970 through one step of movement which is equivalent to 60° of the full rotation of the shaft. Also fast on the shaft 970 is a cam 1120 formed with three depressions evenly spaced along its periphery. Normally resting in one of these depressions is a roller mounted on a pivoted lever 1450. It will be seen that the movement of shaft 970 out of its normal position will cause the roller on lever 1450 to ride on to a high point of cam 1120 whereby the lever itself will rock a short distance in a clockwise direction. Formed on a depending arm of the lever 1450 is a laterally extending stud 1480 which extends in front of an auxiliary latch 1440 cooperable with the arm 990. As shown in Fig. 21 the stud 1480 normally holds the latch 1440 disengaged from the arm 990 but it will be seen that as the lever 1450 rotates under control of its cam 1120 the auxiliary latch will be permitted to move rearwardly to engage the arm 990 which is at this time in its highest elevated position. Arm 990 is thus rendered ineffective immediately after its first actuation by cam 1010 but it will be seen that the step of movement which has been imparted to shaft 970 will so position the ratchet wheel 1060 thereon relatively to its feed pawl 1070 as to permit its advancement by the pawl during each of the next two successive operations of arm 1080 by cam 1110. Due to the contour and relative positions of the cams 1010 and 1110 it is evident that the first effective operation of arm 1080 by cam 1110 occurs approximately 330° after the operation of arm 990 by cam 1010. The second operation of arm 1080 occurs 360° after its first operation so that the three steps of movement of the shaft 970 require only approximately two complete cycles of the main shaft 1. After the second effective operation of the arm 1080 the ratchet wheel 1060 again presents a blank surface to its feed pawl 1070 so that the pawl is again rendered ineffective. It will also be seen that upon this third or normalizing step of the shaft 970 the roller on lever 1450 is again permitted to drop into a depression in the cam 1120 thereby restoring the lever to its normal position to disable the auxiliary latch 1440. At the same time, or just prior to the disabling of latch 1440, the original latch 1040 is permitted to resume its normal engaging position so that the arm 990 continues to be held ineffective. The latch 1040 is permitted to resume its normal position by reason of the fact that the control shaft 940 is positively restored to normal by an arm 1220 fast thereon, which arm is acted upon by the teeth of the ratchet wheel 1060. It is thus seen that the rocking of control shaft 940 conditions the total taking control unit for operation, and during this operation the shaft 970 is advanced through three steps of movement during two cycles of the shaft 1. It is a well known fact that during an operation of total taking in a tabulating machine, the card feeding and sensing operations must be interrupted and the timing of the accumulator engaging and disengaging mechanism altered in order that the accumulator wheels may be reset to zero and the amount previously represented therein printed. Therefore, there is secured to the shaft 970 a cam 1180 (Fig. 21) for causing the cessation of card feeding, a cam 1330 (Fig. 22) for operating the retract bail 64 to disable the locking slides 63, a cam 1160 (Fig. 22) for changing the accumulator timing, and a cam 1150 (Fig. 22) which operates to cause the card stop 54 to remain in lowered position in order that the card which caused the total to be taken may be held in the sensing chamber for a positive sensing after the total taking operation. All of these cams except 1160 are so formed as to become immediately effective upon the first step of the shaft 970 and they will remain effective throughout the second step of the shaft and will be restored to a normal ineffective position upon the third step. The first of the two cycles necessary for a total taking operation is a blank cycle and it is during this cycle that the transfer trip latches in the accumulator are reset. Therefore, the cam 1160 is so constructed as to become effective upon the second step of the shaft 970 and is normalized upon the third step. The linkage operable by the cam 1160 for changing the accumulator timing includes a follower arm 214 (Fig. 22) and an upwardly extending link 212, connected to the arm 214, for rocking the previously mentioned total shafts in the head of the machine.

Returning now to the control shaft 940 which initiates the operation of the total taking control mechanism, it is the usual practice in the Powers tabulating machine to rock this shaft by a movement of the change of designation slides 69 (Fig. 22) through the medium of a settable interponent 840, a bail rod 860 and supporting arms 920, fast on the shaft 940. In the present machine a second means is provided for rocking the shaft 940 and this means resides in an upwardly extending link 211 (Fig. 21) which is connected at its lower end to the restoring arm 1220 fast on the left hand end of the control shaft. The link 211 is pulled upward, to rock shaft 940, when a break in the consecutive order of the serial numbers occurs by means described under the heading "Sensing in comparing unit."

Figure 11:
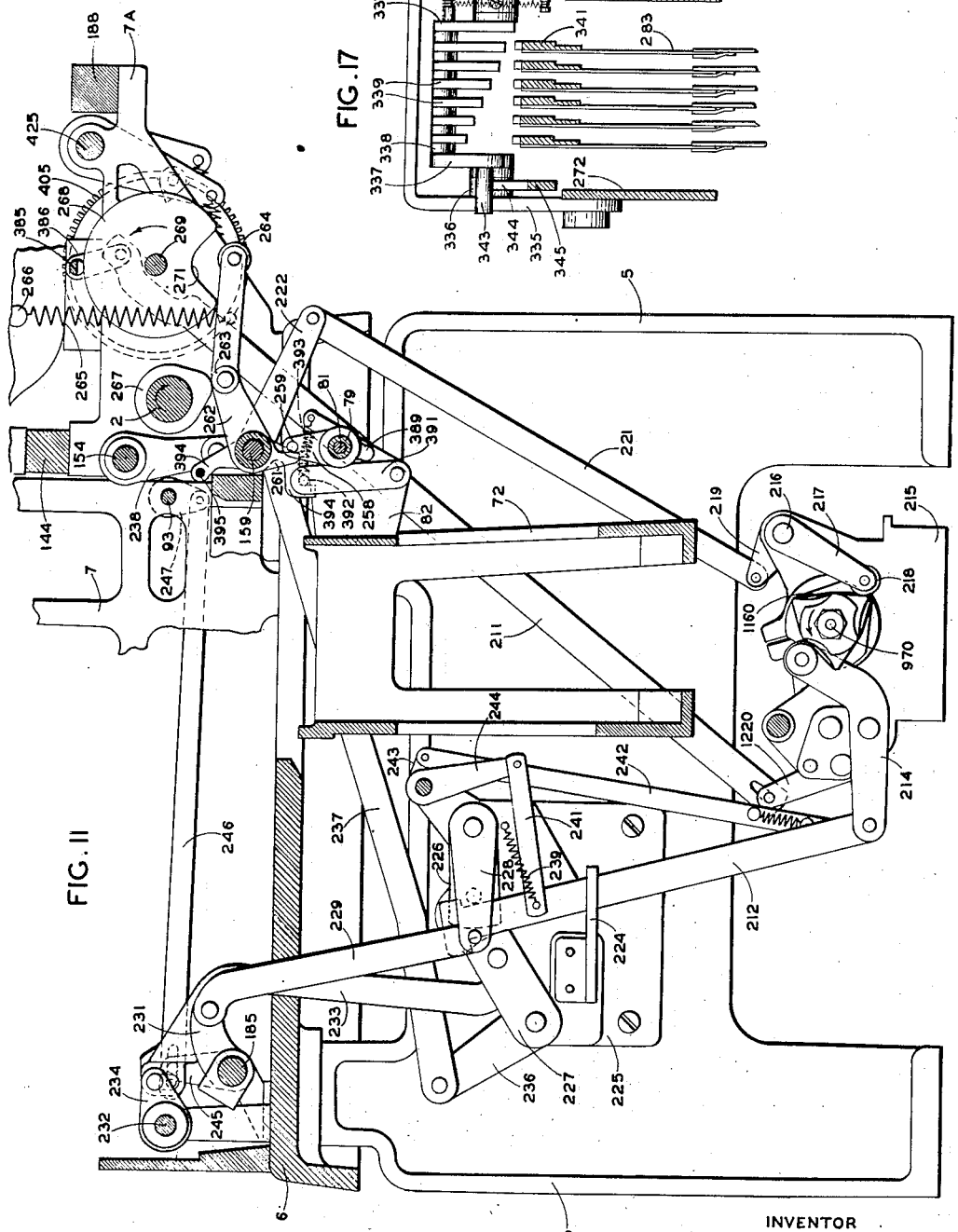
Fig. 11 is a view in right-hand cross section showing the detailed construction of the total control mechanism and a portion of the naught block actuating means.

As mentioned earlier in the description of the total control unit there is a third ratchet wheel, numbered 1230 (Fig. 21) on the shaft 970, which is controlled by arm 1250 operable by the cam 1010 through branch 1200 of the push rod 1030. This ratchet wheel is a part of an assembly which is loosely mounted on the shaft 970 and comprises, in addition to wheel 1230, a pair of cams 1320 and 1280. The previously mentioned latch 1260 which normally holds the feed arm 1250 in ineffective position is adapted to be disabled by an arm 1270 fast on another control shaft 950. The function of this additional mechanism is to cause two successive series of steps of the shaft 970 and to cause the total to be taken from the rear accumulator during the second of the successive series of steps. The operation of this mechanism thus causes two successive total taking operations during the first of which the total is taken from the front accumulator and during the second of which the total is taken from the rear accumulator. As shown in Fig. 22 the shaft 950 is adapted to be rocked by the change of designation slides 69 through an interponent 840, a bail rod 870, and supporting arms 930 fast on the shaft 950. According to the well known construction of this change of designation mechanism, an interponent 840 is provided for each slide 69 and each interponent may be set selectively opposite either bail rod 860 or 870, or it may be raised entirely out of the path of its asociated slide. If an interponent is set opposite the bail 860 a movement of the associated change of designation slide will cause the rocking of shaft 940 alone while shaft 950 will remain inactive. If the interponent is set opposite the bail 870, this bail will be rocked and due to the illustrated formation of arms 930 the bail 860 will also be rocked, so that under this condition of operation both control shafts 940 and 950 will be operated together and cause the simultaneous disabling of the latches 1040 and 1260 (Fig. 21). Upon the simultaneous tripping of the latches 1040 and 1260 the assembly comprising members 1230, 1320, and 1280 is advanced one step by its feed arm 1250 at the same time and through the same distance as the shaft 970. In so doing, the cam 1320 of the assembly positions a blocking assembly, indicated in its entirety as 1000, which assembly rises to hold disabled the latches 1040, 1260, 1440, and latch 1410 which is an auxiliary latch associated with feed arm 1250. The cam 1320 is so formed as to hold the assembly 1000 in effective position throughout the two succeeding steps of the shaft 970 and at the end of the third step of the shaft, at which time the unit would ordinarily be normalized, the latches 1040 and 1440 are still held disabled and the feed arm 990 is permitted to institute a second series of steps. This first step of the second series occurs about 30° after the third step of the first series so that the controlling cams 1180, 1330 (Fig. 22) and 1150 are again moved into an effective position. The timing of the card feeding mechanism is such that during the brief period of 30° in which the control cam 1180 is ineffective no card is being fed. Since the latches 1260 and 1410 which control the arm 1250 have also been held ineffective since the first step of the unit, it will be seen that as the shaft 970 is moved through the first step of the second series by cam 1010, the assembly 1320, 1230, and 1280 is simultaneously advanced by arm 1250 for the third time. The cam 1320 still retains the assembly 1000 in effective position at the end of its third step so that 330° later when the shaft 970 is advanced the second step of the second series by cam 1110 the latches 1040, 1440, 1260 and 1410 are still held disabled. However, 30° after this second step of shaft 970, push rod 1030 is elevated for the fourth time and advances the assembly 1320, 1230, 1280 its fourth step to normalize the cam 1320 and permit the restoration of assembly 1000 to its normal ineffective position. The auxiliary latches 1440 and 1410 immediately move rearwardly and engage their respective arms 990 and 1250 and as cam 1110 advances shaft 970 its third step of the second series the entire unit is normalized, as before described. It will be evident that during these two successive total taking operations the shaft 970 is advanced six steps whereas the assembly 1320, 1280, 1230 is advanced four steps, and that the successive operations are performed in four cycles of the shaft 1. The cam 1280 operates upon the third step of the assembly of which it is a part to shift the link 212 into position to rock the grand total shafts in the head, as will soon be described. As shown in Fig. 11, the framework 215, which supports the total control unit, supports another shaft 216 to the inner end of which is secured an arm 217 bearing a roller 218 at its lower end which bears against the total cam 1160. Secured to the other end of the shaft 216 is an arm 219 pivotally connected at its outer end to an upwardly extending link 221 connected to an arm 222 fast on the previously mentioned shaft 159. The direction of rotation of shaft 970 as it moves from normal position is counter-clockwise as viewed in Fig. 11 and from the formation of cam 1160 it is evident that, upon the first step of movement of shaft 970, or during the blank cycle, the roller 218 will ride upon a high point of the cam 1160, thus rocking arm 217 and shaft 216 counter-clockwise (Fig. 11) to pull downward the link 221 and rock the shaft 159 in a clockwise direction. As previously mentioned one function of the shaft 159 is to disable the special sector release mechanism, through arm 158 and link 157, (see Fig. 9) to prevent the comparing unit sectors from being released during the blank cycle. Another function of the shaft 159 (Fig. 3) is to impart a positive elevating action to the zero stops 88, through a plate 223 fixed to the shaft 159 directly behind the 25-column printing unit. The function of plate 223 is old and well known in this type of machine, and is, in effect, merely a mechanical precautionary measure taken to insure the retention of all of the sectors 89 and 87 at zero position during the blank cycle.

The total link 212 (see Fig. 11) which, as previously stated, is given a downward pulling motion upon the second step of movement of the shaft 970 extends upwardly and forwardly in the machine and is guided in a bracket 224 secured to a subordinate frame member 225 supported by the left-hand main frame piece 5. The head of the total link is T-shaped and is adapted to cooperate with a pair of arms 226 and 227 pivoted to the frame member 225. The arm 226 is connected to the previously mentioned front rock shaft 185 by means of arm 228, link 229 and arm 231 fast on the shaft 185. The arm 227 is connected to another front rock shaft 232 by means of link 233 pivoted to the arm 227 and arm 234 connected to the upper end of link 233 and secured to the shaft 232. The arm 227 is also connected to the previously mentioned rock shaft 154 through arm 236, movable by the arm 227, link 237 connected to the arm 236 and arm 238 connected to the link 237 and fast on the shaft 154. A spring 239 tensioned between the total link 212 and the frame member 225, normally holds the head of the link in contact with the arm 226. If the total link is pulled while in this position the arm 226 will be rocked thereby imparting a clockwise rocking motion to the shaft 185, while the arm 227 remains unmoved. As previously mentioned there is provided a cam 1280 (Fig. 21) in the total control unit for shifting the link 212 out of its normal position when it is desired to take the total from the rear accumulator. The connection from the cam 1280 to the link 212 resides in a lever 1310 (Fig. 21) operable by the cam, a link 242 (Fig. 11) connected to the lever, a pair of arms 243 and 244 and a link 241 connected to link 212. When the link 212 is thus shifted it will be seen that the head of the link will be moved out of engagement with arm 226 and into engagement with arm 227 and when the link is subsequently pulled by cam 1160 the grand total shafts 232 and 154 will be rocked to cause clearing of the rear accumulator. The shaft 185 is the front total shaft of the machine and the shafts 232 and 154 are respectively the front and rear grand total shafts.

One function of the shaft 185, that of altering the timing of the front accumulator, has already been noted. Another function of the shaft 185 is to hold the shaft 93 rocked during a total cycle. As shown in Figs. 4 and 11 an arm 245 is secured to the shaft 185 near its left hand end and the upper end of the arm is connected by means of a pin and slot to a rearwardly extending link 246, connected at its rear end to an arm 247 fixed to the shaft 93. It is evident that a clockwise motion of the shaft 185 (Fig. 11) will prevent any lost motion between the arm 245 and link 246 so that when the shaft 93 is released by cam 90 (Fig. 4), it will be prevented from rocking to its normal position and the zero stops will be held depressed throughout the total cycle.

NAUGHT BLOCK MECHANISM

In the beginning of the chapter on accumulating mechanism mention was made of two units, Last number and Total, in which mechanism is provided for accumulating just one digit (1) for each machine cycle as long as the numbered cards remain in sequence. As shown in Figs. 7 and 8 the units Total and Last number are provided with naught blocks numbered respectively 249 and 251 slidably mounted on the rear of the translator 72. The naught blocks 249 and 251 have their upper ends bent over a plate 252 which guides the translator wires and which is rigidly secured to the upper side frames of the translator 72 itself. Both blocks are spring tensioned downward in the position shown in Fig. 7 and as shown in Figs. 3 and 8 the upper surface of the block 249 has a cut-out portion 253 which lies under the zero stop 88 of the lowest order column of digit stops in the Total unit. The front edge of the same block 249 is formed with a projection 254 which underlies the number one (1) digit stop 86 of the same column as above. The upper end of the special control wire 74, which extends into the Total unit lies just under the projection 254. It is evident, therefore, that when the wire 74 is raised the naught block 249 will move upward with it to elevate the one (1) stop, at the same time permitting the zero stop 88 to pass through the slot 253 so that the actuating sector 87 of that column alone is free to move forward to the upraised digit stop. In the present machine each card fed into the machine bears a special control hole adapted to cause the elevation of wire 74 so that a one will be accumulated in both front and rear accumulators for each card sensed. The naught block 251, also shown in Fig. 8, is constructed of such size as to permit it to cooperate with all six zero stops 88 associated with the Last number unit and also with the "one" digit stop 86 of the lowest order column. A notch 255 is cut in the left-hand edge (Fig. 8) of the block 251 at a point just under the lowest order zero stop 88. The forward edge of the block is formed with a projection 256 which is positioned beneath the "one" digit stop 86, also in the column of lowest order, as above. It is evident that the elevation of naught block 251 will positively raise five zero stops 88 of that unit, but will permit the zero stop in the first column to remain depressed, and at the same time elevate the number one digit stop in the first column. The lowest order sector 87 is the only one permitted to move forward, therefore, and a one is accumulated in the wheels 162 associated with that unit. The elevation of naught block 251 does not occur, however, until the second card following a total is sensed. As previously mentioned, the entire number of the first card following a total is accumulated in the Last number unit and it is during the successive operations that the block 251 operates to add the one. As shown in Fig. 8 the number "one" wire 73 is cut to half its normal diameter at its upper end and lies with its flat portion flush against the forward end of the projection 256. Both wire 73 and block 251, therefore, may elevate the one stop 86 independently of one another.

An operating arm 257, secured to the previously mentioned sleeve 79, is connected to the block 251 and serves to elevate the block when the sleeve is rocked. Referring now to Fig. 11 mechanism is shown therein for rocking the sleeve 79 in a clockwise direction and so elevate the naught block 251. Secured to the extreme left-hand end of the sleeve 79 is an upstanding arm 258 formed with a laterally extending pin 259 at its upper end. The pin 259 is adapted to cooperate with a downwardly extending toe 261 formed on one end of a lever 262 pivoted loosely on the previously mentioned shaft 159. The lever 262 extends rearwardly in the machine and bears a roller 263 at its mid point, a second roller 264 at its far end, and is tensioned upward to move in a counter-clockwise direction about its pivot 159 by a strong spring 265 connected at one end to a stud on the lever 262 and at its other end to a stud 266 on the left-hand frame piece 7 (see Figs. 11 and 12). The roller 263 on the lever is thus constrained to follow the contour of a cam 267 secured to the shaft 2, while the roller 264 cooperates with a cam 268 secured to a shaft 269. The shaft 269 is a one cycle clutch shaft, operable only during total taking cycles, and is adapted to complete one revolution for two cycles of the shaft 2. A detailed description of this clutch is given under the heading "One cycle clutch mechanism." The cam 268 is formed with a deep notch 271 which, in the rest position of shaft 269, lies directly over the roller 264. In the normal rest position of the machine (Fig. 11) the high point of the cam 267 bears against the roller 263 and holds it depressed against the tension of spring 265. However, as soon as the shaft 2 begins to rotate (clockwise as viewed in Fig. 11) the roller 263 will ride onto the low point of cam 267 and will stay there until near the end of the cycle. When the high point of cam 267 moves away from the roller 263 the lever 262 rocks upward in a counter-clockwise direction, forcing arm 258 and sleeve 79 in a clockwise direction, through toe 261 and pin 259, to operate the arm 257 and elevate the block 251. During normal accumulating cycles the above operation is repeated, once for every cycle of the shaft 2. If, however, the shaft 269 is caused to rotate, the notch 271 of the cam 268 will move out of the path of roller 264 and be replaced by the high outside surface of the cam which will force the lever 262 and block 251 to remain depressed until the shaft 269 completes its single revolution. During these two machine cycles a total operation is effected and the number of the first card following a total is sensed and accumulated. The shaft 269 begins to rotate almost immediately after the beginning of the total cycle but it is possible that the lever 262 will rise a short distance before being disabled by cam 268. This may result in a flicker of the block 251 but will not affect the operation of the machine, since the type sectors are not released until later in the cycle. The operation and support of the shaft 269 will be considered in greater detail farther on in the specification.

Referring now to Fig. 6, it will be recalled that certain translator mechanism including a lever 76 and a link 75 connected to the nine wire 73 was described as being dependent for its operation upon the rocking of the sleeve 79. It is a well known fact that in the 90-column type stop basket construction, as employed in the present machine, an even numeral (2–4–6–8) is obtained by elevating the "nine" stop 86 and in combination with it the odd numbered stop 86 which represents one less than the desired numeral. For example, a two would result from the elevation of the one stop, and the "nine" stop, the displacement of the "nine" stop permitting the entire column of stops 86 to move forward one extra step. It is evident that if the first denominational order of digit stops associated with the Last number unit were permitted to function in the above manner the effectiveness of the naught block 251 would be destroyed since it is highly probable that at some time during a run of consecutively numbered cards the nine stop of the lowest order column would be elevated, thus causing a two instead of a one to be accumulated. In order to avoid this condition the previously described mechanism comprising lever 78 on the sleeve 79, lever 76, link 75 and pin 83 is provided so that the lowest order nine stop may be elevated only on the first machine cycle following a total taking operation.

COMPARING UNIT

Figure 13:
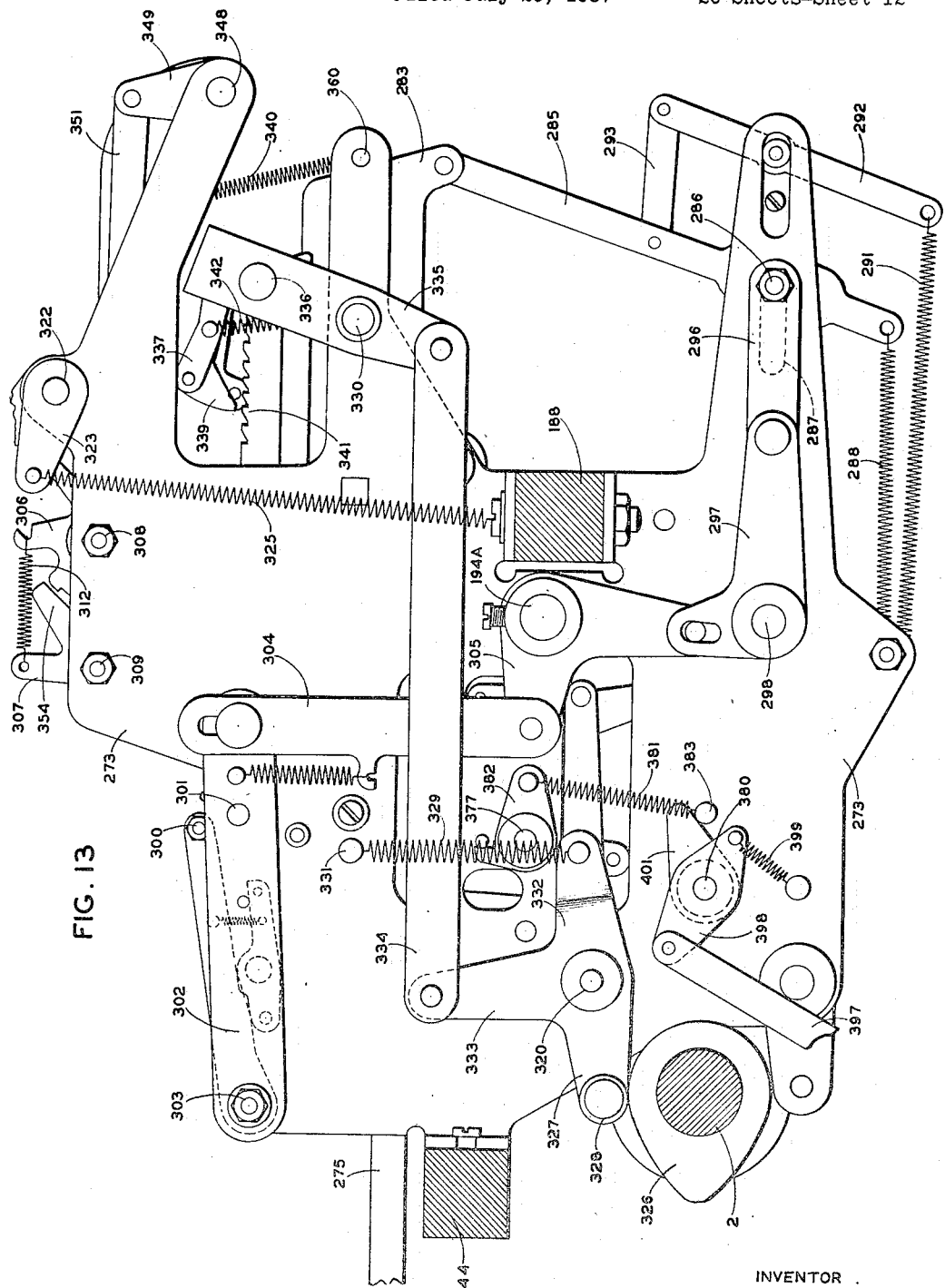
Fig. 13 is a view in right-hand side elevation of the special comparing unit.
Figure 14:
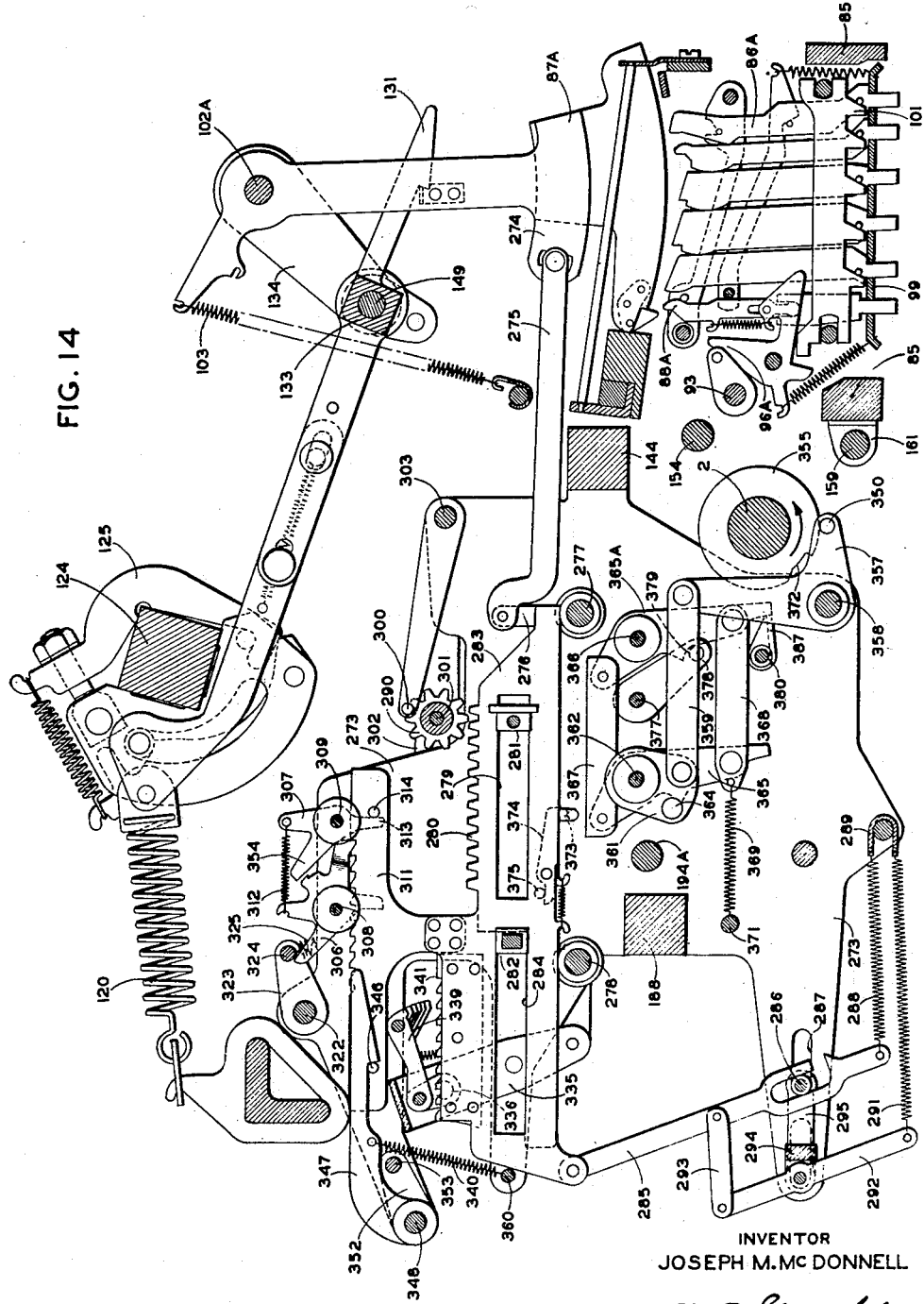
Fig. 14 is a view in cross section of the special comparing unit with the left-hand frame plate removed.

As previously noted, the mechanism whereby the number of each card is compared with that of its predecessor is embodied in a special unit which in the present instance is mounted a short distance inside the left-hand frame piece 7 (see Figs. 3 and 4). As shown in Figs. 3, 4, 9, 12, 13, 14, and 15, this special unit comprises a pair of parallel, similarly shaped, frames 272 and 273 each of which is secured, in an identical manner, to the previously mentioned cross bars 144 and 188. The two frame members 272 and 273 are further held in rigid alignment by various cross shafts and tie rods to be noted with more particularity in their proper place in the description. The special sectors 87A are positioned directly in front of the comparing unit and as shown in Fig. 14 each sector is formed with a rear extension 274 to which is connected a rearwardly extending link 275 (see also Fig. 15) connected at its rear end to a rack 276 guided on a pair of cross rods 277 and 278 rigidly mounted between the frames 272 and 273. Each rack 276 is formed with a cut out portion or slot 279, and a bar 281 rigidly mounted between frames 272 and 273 extends through the slots 279. Another bar 282, mounted as the bar 281, is positioned just behind a rear shoulder of the racks 276 and limits the rearward movement of the racks. The racks 276 are thus free to move horizontally, forward and backward, with the sectors 87A. Interposed between each pair of racks 276 is another rack 283 (see Figs. 14 and 16) also slidably guided on the cross rods 277 and 278. The racks 276 and 283 are equal in number, there being six of each. The racks 283 are further supported and limited by bars 281 and 282 in the same manner as racks 276. However, the racks 283 extend farther rearwardly than the racks 276 and have formed in their rear surface a second slot 284 through which the cross bar 282 extends. All of the racks 276 and 283 are formed with an equal number of gear teeth 280 cut in their upper edge. All of the teeth 280 are identically spaced and formed and are adapted to cooperate with a set of tie gears 290 in a manner later to be described. Connected to the rear of each rack 283 is a downwardly extending link 285 (Figs. 14 and 15) pivoted near its bottom end to a rod 286 mounted in slots 287 cut in the frames 272 and 273. A spring 288 is tensioned between the extreme lower end of each link 285 and a bracket 289 fixed between frames 272 and 273. The tension exerted by the springs 288 tends to rotate the links 285 in a counter-clockwise direction (Fig. 14) about their pivot 286 and so normally serves to retain the racks 283 in the retracted position shown in Fig. 14. Additional spring tension is imparted to the links 285 by springs 291 also anchored to the bracket 289 and connected to the links 285 through arms 292 and links 293. The arms 292 are pivoted at about their mid point to a block and shaft 294 slidably mounted between the frames 272 and 273 and connected to the shaft 286 by a pair of links 295. As shown in Figs. 9 and 13 an arm 296 is pivoted to each end of the shaft 286 on the outside of the respective frame plates 272 and 273. The arms 296 extend forwardly and each is connected to a rear extension of a bell-crank lever 297 secured to a shaft 298 pivotally mounted between the side frames 272 and 273. The point of connection between each arm 296 and its lever 297 is a toggle connection normally positioned as illustrated to retain the shaft 286 in the rear of the slot 287 against the tension of springs 288 and 291. If, however, the shaft 298 is caused to rock in a counter-clockwise direction (Fig. 9), it is evident that the toggle will be broken and the shaft 286 will advance to the forward end of the slot 287, thus slackening the tension of springs 288 and 291 to an extent which will permit the racks 283 to move forward more freely.

Positioned in the comparing unit, therefore, are twelve horizontally movable racks. Six of the racks, numbered 276, are connected directly to the spacial sectors 87A and follow their movements. The other six racks, numbered 283, are ranged loosely alongside the sector racks and are normally spring-tensioned towards the rear of the machine. Upon sensing the first card following a total, mechanism is provided for carrying the racks 283 forward with the racks 276 and positioning them in accordance with the numerical representation of the first card. Detent mechanism is provided for retaining the racks 283 in their projected position when the sectors 87A return to zero, and counting mechanism operates, before the sectors are again released, to feed the units rack 283 one tooth space forward. Now as the second card is sensed the sectors 87A again move forward to digit stops 86A and thereby position their racks 276. If the number on the second card is just one digit higher than that on the first card, then the racks 283 and 276 will be arranged in exact symmetrical order. While the racks are thus positioned sensing mechanism operates to determine the arrangement of racks 276 and 283. If, as in the above case, the racks are in identical order, nothing will happen and the second card will be counted in the Last number and Total units in the usual manner. The comparing mechanism will function in the above manner through each cycle of the machine until a break in sequence occurs, that is, when the number of a card being sensed is either a duplicate of its predecessor or is more than one digit higher. Under this condition when the racks 276 and 283 are sensed and found not to be arranged identically, the total control mechanism, previously described, is automatically tripped and the number of that non-sequential card is neither counted nor accumulated until the total taking operation is over. The card that tripped the total will then become the first card of a new sequence and the counting and comparing operations proceed as above. A total taking operation automatically restores the racks 283 and conditions the unit for a new series of operations.

The comparing racks 283 are carried forward upon the first operation after a total by the previously mentioned set of six tie gears 290 (Figs. 14 and 15) loosely mounted on a shaft 301 supported between a pair of arms 302 (Figs. 9 and 13) secured to the outside ends of a shaft 303 pivotally mounted between the frames 272 and 273. The rear end of each arm 302 is resiliently connected to a vertical link 304 connected at its lower end to one arm of a bell-crank lever 305. The bell-crank levers 305 are secured to opposite ends of a shaft 194A loosely mounted between the frames 272 and 273. The shaft 194A lies in the same plane with the previously mentioned shaft 194. Shaft 194A, however, operates independently of the shaft 194 and is adapted, when rocked, to move the tie gears 290 into and out of engagement with the racks 276 and 283. Clockwise motion of the shaft 194A (Fig. 9) lowers the gears 290 into engagement and counter-clockwise motion of the shaft serves to elevate the gears. The means for rocking shaft 194A is described under the heading "One cycle clutch mechanism." Referring now to Fig. 16, there is shown therein a rack 276, a rack 283, and a single cooperating tie gear 290. The teeth on the gear 290 are of a sufficient width to engage both rack 276 and 283 at the same time. Now, assume that a total has been taken and the shaft 194A rocked in a clockwise direction (Fig. 9). All of the racks are in their retracted position and as the gears 290 descend each gear engages the teeth 280 of a pair of racks 276 and 283. Then, as the number of the first card is set upon the digit stops 86A, the special sectors 87A spring forward at the same time positioning the racks 276 and, through tie gears 290, also the racks 283. A short while after the sectors 87A reach their full forward position the shaft 194A is rocked counter-clockwise (Fig. 9) thus returning the gears 290 to normal. Now, as the sectors 87A are restored the racks 276 will, of course, restore with them, leaving the racks 283 extended to the representation of the card just sensed. The shaft 194A normally remains stationary and is rocked only near the end of the total cycle and returned a short time after the beginning of the following cycle. While sensing in sequence, therefore, the tie gears 290 remain elevated and ineffective. The actuating means for positioning the sectors 87A, the racks 276 and racks 283 on the first card following a total resides only in the springs 103. It is in order that the work of the springs 103 may be made easier and swifter that the normally active spring tensioning means for retaining the racks 283 in retracted position is disabled. It is evident that a clockwise motion of rotation of the shaft 194A (Fig. 9) will impart an oppositely directional motion to the bell crank levers 297 to relieve the tension of springs 288 and 291 as previously described. It is also evident that the restoration of shaft 194A will automatically re-tension the above springs. An aligning rod 300, which engages the gears 290 only in their elevated position, is provided in order to prevent the tie gears from becoming disarranged.

The detent mechanism whereby the comparing racks 283 are retained in extended position, against the tension of springs 288 and 291, comprises a plurality of detents 306 and latches 307 (Figs. 14 and 15) loosely mounted respectively on shafts 308 and 309 fixed between the side frames 272 and 273. There are six sets of pawls 306, and latches 307, a pair being provided for each rack 283. Each of the racks 283 has secured thereto an upstanding T-shaped rack 311 adapted to cooperate, through teeth cut along its upper edge, with one of the detent pawls 306. In the normal position of the racks, illustrated in Fig. 14, each detent pawl 306 is lowered about its pivot 308 and engages the front tooth of its associated rack 311. A spring 312 tensioned between upstanding arms of each of the pawls 306 and the latches 307 normally serves to retain the pawl 306 in engaging position. Each of the latches 307 is formed with a downwardly extending arm 313 against which a stud 314 on each rack 311 normally bears. With the racks 283 in normal position the studs 314 will hold the latches 307 rocked slightly in a clockwise direction (Fig. 14) against the tension of springs 312. The angular direction of the teeth on the rack 311 is towards the rear of the machine so that the racks 283—311 may move forward freely at any time, but will normally be prevented from returning. The detent pawls 306 are, of course, disengaged during total strokes, and the same mechanism that causes their disengagement remains effective during the first part of the cycle following a total in order that the racks 283—311 may be positioned without placing an unnecessary burden upon the springs 103. As shown in Fig. 9 a stud 315 is secured to the left-hand frame plate 272 and a cam 316, secured to a collar 317, is supported by the stud and rotates thereon. The collar 317 is fast on the inner end of the previously mentioned shaft 269 (Fig. 12) which is supported at its opposite end by an auxiliary frame member 7A, mounted on the base plate 6 of the head. Cooperating with the cam 316 is a roller bearing bell-crank lever 318 (Fig. 9) pivoted to the side frame 272 and connected to an upwardly and rearwardly extending link 319. The link 319 is pivotally connected at its upper end to another bell-crank lever 321 secured to the left-hand end of a shaft 322 loosely supported between the side frames 272 and 273. Fast on the opposite end of the shaft 322 is a forwardly extending arm 323 (Figs. 13 and 14) and a bail rod 324 is rigidly supported between an arm of the lever 321 and the arm 323. The bail rod 324 normally lies just over rearwardly extending portions of the detent pawls 306 and is tensioned downward by a spring 325 connected at one end to the right-hand side of the bail rod 324 and at its other end to a bent-over ear on the side frame 273. The bail rod 324 is normally retained in the position shown in Fig. 14, however, by reason of the fact that the high point of the cam 316 normally bears against the lever 318 holding it rocked against the tension of spring 325. The shaft 269 to which the cam 316 is secured, through collar 317, is, as was previously mentioned, a one cycle shaft operable only during total cycles and the cycle immediately following a total cycle. It is evident that a short time after the cam 316 begins to rotate (clockwise as viewed in Fig. 9) the roller on the bell-crank 318 will drop into the dwell of the cam, causing the bell-crank 321 and its shaft 322 to rock a short distance in a clockwise direction (Fig. 9), thus lowering the bail rod 324. As shown in Fig. 14, the depression of bail rod 324 will immediately rock all of the detent pawls 306 out of engagement with their racks 311 and permit the racks to return to normal under tension of their springs 288 and 291. The dwell of the cam 316 is of such length as to permit the bail rod 324 to remain in disabling position during the remainder of the total stroke and the first portion of the next succeeding cycle. Thus, when the racks 283—311 are pulled out to set up a new number, the detents 306 do not act as a drag to retard their movement. The detents 306 are permitted to reengage their racks 311 just before or at about the same time that the tie gears 290 move out of engagement with the racks 276 and 283. The racks 283 are thus held extended while the racks 276 are free to return to normal.

COUNTING MECHANISM

The counting mechanism previously referred to whereby the units rack 283 is advanced one step every time a card is sensed is operated by a cam 326 (see Fig. 13) secured to the main head shaft 2. The cam 326 is, of course, constantly rotating and is adapted to cooperate with a three-armed bell-crank lever pivoted at 320 to the side frame 273. One arm 327 of the above lever has a roller 328 on its forward end which rests on and follows the periphery of the cam 326. A spring 329, tensioned between a stud 331 on the frame 273 and a second arm 332 of the three-armed lever, tends to rotate the lever in a counter-clockwise direction (Fig. 13) and so serves to retain the roller 328 in constant contact with the cam 326. The third arm 333 of the bell-crank lever is connected to a rearwardly extending link 334 which is connected at its far end to the lower end of an operating lever 335. The lever 335 is of a generally U-shaped construction, as shown in Figs. 9, 13, and 17, and the downwardly extending arms thereof are pivoted at 330 to the respective side frames 272 and 273. Secured to the inner surface of each arm of the U-shaped lever 335 is a stud (Fig. 17) to each of which is pivoted a pair of arms 337. Supported by rivets between the arms 337 is a plurality of spacers 338 and operating pawls 339 riveted together for movement as a unit. There are six pawls 339 (one for each rack 283) each of which is formed with a forwardly extending tooth adapted to cooperate with an associated ratchet plate 341, one of which is secured to the rear of each rack 283 (see Figs. 14 and 15). As shown more clearly in Fig. 17, the teeth of the pawls 339 are of varying graduated lengths, the longest pawl tooth being positioned just above the units rack 283 and the shortest pawl tooth lying just above the highest order or hundred thousands rack. The entire assembly, comprising arms 337, spacers 338 and pawls 339, is tensioned to move downward about the pivot points 336, or counter-clockwise as viewed in Fig. 13, by a spring 342 tensioned between the right-hand arm 337 and a stud on the inner surface of the right-hand arm 335. The above assembly is normally held in the position shown in Fig. 13, however, through a stud 343 formed on the outside surface of the left-hand arm 337, which stud normally rests on an upturned toe 344 of a fixed plate 345 secured to the inside surface of side frame 272 (see Fig. 9). Returning now to the operation of cam 326, it is evident that, when the bell-crank lever, comprising arms 327, 332, and 333 is rocked, the U-shaped lever 335 will pivot in a counter-clockwise direction (Fig. 13) about points 330, thus moving the arms 337 forwardly. As the lever 335 and the arms 337 advance, the stud 343 will ride off of the toe 344 permitting the pawls 339 to rock downward under tension of the spring 342. When the pawls have moved downward a short distance, the units order pawl 339 will engage its associated ratchet plate 341 and so limit the downward movement of the assembly 337, 338, and 339. The lowest order or units pawl 339 engages the first tooth on its plate 341 and it is evident that continued forward movement of the lever 335 will advance the units plate 341, and, therefore, the rack 283 to which it is secured, a distance determined by the extent of forward movement permitted the lever 335, which in the present instance is enough to advance the rack 283 one tooth space. If the operation of lever 335 occurs when the detent pawls 306 are engaging their associated racks 311, then the units order rack 283 will be advanced, and latched again in advanced position, once for each cycle of the shaft 2. If, however, the detent pawls 306 are disabled, the units racks will immediately return to normal under tension of springs 288 and 291.

In order that the racks 283 may retain a correct decimal representation at all times, mechanism is provided whereby each rack 283 may be restored to zero after it has been advanced the equivalent of ten steps of movement without a break in sequence. When any rack 283 is advanced its tenth step the rack 283 of next higher order is simultaneously advanced one step. Taking the lowest order or units rack as an example and assuming that it started from zero position it will be readily seen that the ninth step of movement of this rack will cause it to move out from under its pawl 339 causing the assembly 337, 338, and 339 to drop downward until the tens order pawl 339 contacts its associated ratchet plate 341. Now, as the lever 335 is again actuated, the units pawl pushes against the rear of its rack and the tens pawl simultaneously advances the tens rack one tooth space. The above operation is duplicated ten times until the tens rack has advanced ten steps. With the last step of the tens rack, the hundreds rack is moved one step, and so on through the entire set of six racks.

As shown in Figs. 14 and 15 each of the auxiliary racks 311 is formed with two studs, the previously mentioned stud 314 at the front of the rack, and another stud 346 at the rear. The studs 346 are normally engaged by a plurality of latches 347 formed with cam shoulders which normally lie in front of the studs. The latches 347 are individually pivoted to a shaft 348 pivotally supported between rear extensions of the side frames 272 and 273. A spring 340, tensioned between each latch 347 and a tie rod 360, secured between lower rear extensions of the frames 272 and 273 serves to retain each latch and its studs 346 in contact. Secured to the left-hand end of the shaft 348 is an upstanding arm 349 (Fig. 9) connected, at its upper end, to a link 351 connected, in turn, to an arm of the previously mentioned bell-crank lever 321. The operation of bell-crank 321 is, as previously mentioned, to rock clockwise from normal to disable the detent latches 306 in order that the racks 283 may be withdrawn during a total taking operation and then reset. It is evident that clockwise motion of bell-crank 321 will be imparted, through link 351 and arm 349 to the shaft 348 to rock it in a counter-clockwise direction (Fig. 14). Secured to the shaft 348 is a pair of arms 352 which support between their forward ends a bail rod 353 normally positioned just under the latches 347. Counter-clockwise motion of the shaft 348 (as viewed in Fig. 14), therefore, will be imparted, through bail rod 353 to the latches 347 causing them to be disabled at about the same time as detents 306. The function of latches 347 will be more apparent from the following description.

When the racks 283 are first set the studs 314 move away from arms 313 of the latches 307 and permit the latches to rock a short distance counter-clockwise (Fig. 14) under tension of springs 312 until rearwardly extending arms 354 thereof contact the front edge of their respective detent 306. On the first step from the zero position taken by the units rack 283 under actuation of lever 335 the stud 346 thereon cams the latch 347 upward out of its path. On the tenth step of movement of the rack 283 the stud 346 contacts and actuates a downwardly extending arm of its associated detent 306, forcing the detent counter-clockwise (Fig. 14), thus freeing the rack 283 and permitting it to return to zero under tension of the springs 288 and 291. As the rack reaches its zero position the stud 346 is reengaged by the latch 347 and so prevented from rebounding from normal position. When the detent 306 is disabled by the stud 346 the arm 354 of latch 307 is permitted to engage a shoulder formed in the front edge of the detent and so prevent the detent from engaging the rack while it is returning to normal. Arm 354 is removed from its latching position by stud 314 as the rack reaches its normal position so that its associated detent 306 may again engage auxiliary rack 311.

SENSING IN COMPARING UNIT

As noted in a previous paragraph, shortly after the sectors 87A are released, the relative arrangement of the racks 276 and 283 is sensed or compared. If identically arranged, then the machine is in sequence. If not identically arranged, the machine is out of sequence and a total is automatically tripped.

Secured to the shaft 2 is a cam 355 (see Figs. 12, 14, and 15) adapted to cooperate with a roller 356 supported between an arm 356 and a bell-crank lever 357 both fast on a shaft 358 loosely supported between the side frames 272 and 273. The lever 357 is positioned just inside the frame plate 272 and is formed with an upwardly extending arm (Fig. 14) connected to a horizontal link 359. The link 359 is connected at its rear end to a lever 361 loosely mounted on a shaft 362 rigidly supported between frames 272 and 273. Just inside the frame plate 273 is an upstanding arm 363 (Fig. 15) similar to the upstanding arm formed in bell-crank 357 and also secured to the shaft 358. A horizontal link 359A is connected to the upper end of arm 363 and link 359A, like its counterpart 359, is connected at its rear end to a lever 361A also pivoted to the shaft 362. Rigidly supported between rear ends of the lever 361 and 361A is a bail rod 364 normally adapted to bear against and hold retracted six arms 365 pivoted to the shaft 362. Also rigidly supported between side frames 272 and 273, a short distance in front of the shaft 362, is another shaft 366 upon which are pivoted six arms 365A similar in every respect to the arms 365. The arms 365 and 365A extend slightly above their pivot points 362 and 366 and each pair of arms 365 and 365A is connected by a link 367. A link 368 connects the lower ends of each pair of arms 365 and 365A and a spring 369, tensioned between the rear of each link 368 and a shaft 371, rigidly supported between side frames 272 and 273, tends to rotate all of the arms 365 and 365A, in a counter-clockwise direction (Fig. 15). The arms are normally retained in the position shown in Fig. 15, however, by reason of the fact that the high point of cam 355 is holding the roller 350 depressed and, therefore, through bail rod 364 is holding arms 365 and 365A retracted. The arms will be held in this position until a dwell 372 on cam 355 passes over the roller 350 at which time the springs 369 will be free to rock the arms 365 and 365A unless the arms are otherwise held retracted.

It is evident that counter-clockwise motion of arms 365 and 365A will elevate the parallel links 367. Each link 367 lies directly under a pair of racks 276 and 283. As shown more clearly in Fig. 16 the lower edge of each sector rack 276 is formed with a downwardly extending lug 373. Each of the comparing racks 283 has an arm 374, pivoted to its right-hand side which is spring tensioned to move downward in a clockwise direction (Fig. 14) about its pivot. A rearwardly extending portion of the arm 374 limits against a stud 375 and prevents it from moving farther downward than is shown in Fig. 14. The lower end of each arm is formed with a laterally extending stud 376 which projects beneath the next adjacent rack 276, and normally lies directly beneath the lug 373 thereon. The position of lugs 373 and arms 374 will, of course, vary from time to time but when the racks are sensed, if the machine is in sequence each lug 373 will lie directly over its associated stud 376. Assuming this to be the case it will be seen that, as the dwell on cam 355 passes over roller 350 all of the parallel links 367 will begin to rise, and shortly after they start upward will contact their associated studs 376 of the arms 374. The rigid lugs 373 are positioned just over studs 376 and so prevent the parallel links from rising any farther. The distance rocked by the arms 365 and 365A, therefore, is very short and as the cam 355 continues its rotation bail rod 364 will be moved forward and the arms again retracted. If, however, the machine is out of sequence, that is, if the lug 373 and stud 376 of any pair of racks 276 and 283 are out of alignment, then at least one of the parallel links 367 will move upward to its full extent, thus tripping a total in a manner now to be described.

Loosely supported between the side frames 272 and 273 is a shaft 377 (Figs. 14 and 15) to which is secured a pair of arms 378 and 378A, one positioned just inside the frame 272 and the other just inside the frame 273. Rigidly supported between lower ends of the arms 378 and 378A is a bail rod 379 positioned just in the rear of the arms 365A and in their path of movement. The bail rod 379 is normally held in the position shown in Fig. 15 by a spring 381 (Fig. 13) tensioned between an arm 382, fast on the right-hand end of the shaft 377, and a stud 383 on the outer surface of the frame plate 273. A nose of the arm 382 limits against another stud on frame 273 and prevents an overthrow of bail 379 by spring 281. Now, when during the course of machine operation a break in sequence occurs, one or more of the parallel links 367 will rise to its full extended position and an arm 365A will rock rearwardly carrying with it the bail rod 379. Rearward motion of the bail rod 379 is imparted to shaft 377, through arms 378 and 378A, to rock the shaft a short distance in a counter-clockwise direction (Fig. 15). As shown in Figs. 9 and 12 the shaft 377 extends through the left-hand side frame 272 and is secured, by means of a collar 384 to shaft 385 loosely supported at its other end by the auxiliary frame piece 7A. Secured to the shaft 385 at a point near the frame 7A is a rearwardly extending arm 386 (see also Figs. 11 and 18) connected at its outer end to the previously mentioned downwardly extending link 211. The motion of shaft 377, as it moves from normal, is clockwise as viewed in Fig. 9, which will cause the shaft 385 to rock in the same direction (counter-clockwise as viewed in Fig. 11) and pull upward the link 211, through arm 386. As noted earlier in the specification anything which lifts the link 211 upward and so rocks the arm 1220 will initiate a total taking operation.

Additional mechanism adapted to prevent untimely operation of the sensing mechanism, and to permit the present machine to be used for regular adding and listing work by simply replacing the translator, is shown in Figs. 3, 7, 11, and 15. Referring first to Fig. 15, there is shown therein a blocking member or bail 387, which normally engages toes formed on the lower ends of the arms 365A and so prevents the parallel links 367 from moving from normal position.

The blocking bail 387 is secured to a shaft 380 pivotally mounted between side frames 272 and 273. When tabulating a group of cards according to consecutive designation numbers, the bail 387 is disabled almost immediately after a card is sensed and held disabled until the arms 365A are completely restored.

Referring now to Figs. 7 and 11 it will be seen that an arm 388 is connected to the naught or card count block 249 of the Total unit and that the arm is fast to the previously mentioned shaft 81. Also fast to the shaft 81 near its right-hand end (Fig. 11) is a short arm 389, the lower end of which contacts a lever 391 pivoted to the right-hand bracket 82. The upper end of the lever 391 bears a stud 392 which extends across and above the bracket 82. A spring 393 tensioned between the stud 392 and a stud on the bracket 82 holds the rear edge of the lever 391 in contact with the arm 389. It is evident that when the special control wire 74 is raised and the naught block 249 elevated, the shaft 81 and its dependent arm 389 will rock clockwise (Fig. 11) to rock lever 391 a short distance in the opposite direction about its pivot on bracket 82. Referring now to Figs. 3, 11 and 12, an arm 394 is pivoted loosely to the shaft 159 and has an angled lower portion which engages the stud 392 of the lever 391. The arm 394 extends above its pivot point 159 and its upper end acts as a support for one end of a rod 395 (see Fig. 12). The rod 395 extends back across the front of the comparing unit and is supported at its other end by an arm 396 also pivoted to the shaft 159 (see Fig. 3). The arm 396 extends to the rear of the shaft 159 and is connected to a link 397, which is connected at its other end to a lever 398 secured to the outer end of the shaft 380. A spring 399 tensioned between the lever 398 and a stud on the outer surface of the frame 273 tends to hold the shaft 380 in blocking position and an arm 401 also secured to the shaft 380 limits against the stud 383 to prevent an overthrow by spring 399. Returning now to the operation of shaft 81 it will be seen that as soon as the shaft is rocked, the assembly comprising arm 394, rod 395, and arm 396 will be rocked in a clockwise direction (Fig. 3) to rock the lever 398 and shaft 380 counter-clockwise and thus disable blocking bail 387. Bail 387 is, of course, disabled before the swell 372 of cam 355 reaches the roller 350.

It is evident, therefore, that when the card count block 249 is up the blocking bail 387 will be ineffective, and that when the block 249 is down the bail 387 will be in effective position, thus rendering ineffective the sensing cam 355. In beginning a machine operation the first card to enter the machine will automatically trip off a total taking operation on the second sensing of the parallel links 367. The first operation of the link occurs as the first card is being fed from the storage chamber and while all of the racks 276 and 283 are at normal. Shortly after this first sensing the units rack 283 is advanced one step by the counting cam 326, thus disrupting the identical arrangement of the racks. Then upon the second operation of the parallel links 367 a total is tripped and the machine conditioned for a positive listing of the record cards. It should, perhaps, also be explained at this point that the special sectors 87A are positioned, and the relative arrangement of the racks 276 and 283 compared, before the release of the printing sectors 89. Thus, when a break in sequence occurs the machine immediately indexes into the blank or idle stroke which precedes a total and the number of the card which caused the total is not accumulated until the total operation is over, when it becomes the first number of a new sequence.

ONE-CYCLE CLUTCH MECHANISM

As previously noted, the mechanism for rendering the cam 267 ineffective (Fig. 11), for operating the tie gears 290 (Fig. 9), and bell-crank lever 321 of the detent and rack rebound mechanisms is operable only during a total taking operation and the cycle immediately following a total. The above operations are performed directly from the previously mentioned auxiliary shaft 269. The shaft 269 is normally inactive but will begin to rotate immediately after the start of a total cycle and will continue to rotate until it completes one full revolution. The shaft 269 is geared to the shaft 2 in such a manner that one revolution of the shaft 269 takes place during two revolutions of the shaft 2.

As shown in Figs. 4, 12, 18, and 19 the shaft 269 extends through the auxiliary frame member 7A and has its outer end pivotally mounted in the upper end of a plate 402 which forms one element of a bracket, fixed to the frame 7A, and which comprises plate 402, block 403 and another plate 404. Loosely mounted on the shaft 269, near its outer end is a gear wheel 405 meshing with a smaller gear wheel 406 secured to the outer end of shaft 2. The gear wheel 405, therefore, is a continuously rotating wheel driven in a clockwise direction (Fig. 18) by the gear wheel 406. The gear wheel 405 is formed with an inwardly extending collar 407, which also loosely surrounds the shaft 269, and which has two oppositely disposed slots 408 cut longitudinally in its outer surface. Fast on the shaft 269 and positioned a short distance inside the wheel 405 is a disc 409 to which is pivoted, at 411, a lever 412 adapted to cooperate, through a nose 410 formed thereon, with slots 408 in the collar 407. The lever 412 is tensioned to move in a clockwise direction (Fig. 18) about its pivot 411 by a spring 413 tensioned between the rear end of the lever and a stud 414 on the disc 409. The nose 410 of the lever 412 is, however, normally prevented from engaging either of the slots 408 by an arm 415 which rests under a roller 416 on the forward end of the lever 412 and holds the lever rocked in the position shown in Fig. 18. The arm 415 is pivoted to a stud 417 on the plate 404 and is connected at its lower end to the rearward end of a link 418. As shown in Fig. 4 the link 418 extends towards the front of the machine and is resiliently connected to an arm 419 fast to the total shaft 185. An extension of link 418 lies in front of an arm 421 on the grand total shaft 232. The motion of shafts 185 and 232, as they rock from normal, is counter-clockwise as viewed in Fig. 4 so that in the event of either a total or grand total operation the link 418 will be forced rearwardly to disable the retaining arm 415 and permit the nose 410 of lever 412 to engage one of the slots or grooves 408. It is evident that the positive engagement of lever 412 and gear wheel collar 407 will cause the disc 409, and the shaft 269 to which it is secured, to rotate with the gear wheel 405 (see Fig. 19). At the end of the total cycle, and before the shaft 269 has completed its single revolution the arm 415 will be restored to normal and as the shaft 269 completes its cycle the roller 416 will contact and limit against the arm 415, forcing the nose 410 out of its slot 408, thus disengaging disc 409 from gear wheel 405. In order that the shaft 269 may be stopped in exactly the same position each time, a V-shaped detent notch 422 is cut in the disc 409. The notch 422 is adapted to cooperate with a roller 423 on an arm 424 loose on a shaft 425. A spring 426 tensioned between a stud on the lower end of the arm 424 and a stud on the plate 404 serves to retain the roller 423 in constant contact with the periphery of the disc 409. The shaft 425 is an auxiliary shaft adapted to operate the tie gears 290. The shaft 425 is loosely supported, at one end, by the side frame 7A, while the other end is secured, by means of a collar 426 (Figs. 9 and 12) to the previously mentioned shaft 194A in the comparing unit. The shaft 425 extends a short distance beyond the frame 7A and has secured to its outer end a downwardly extending arm 427 (Fig. 4) bearing a roller 428. A cam 429 fast on the outer end of the shaft 269 cooperates with the roller 428 and is adapted to rock the arm 427 and shaft 425 in a clockwise direction (Fig. 4) once for each cycle of the shaft 269. From the shape of cam 429 it is evident that shaft 425 will be rocked late in the total cycle and will remain rocked for less than a third of the following cycle. A spring 431 tensioned between the lower end of arm 427 and a stud on the plate 402 causes the roller 428 to follow the periphery of cam 429. Clockwise motion of shaft 425 will, of course, impart a like motion to the shaft 194A (Fig. 9) to cause the engagement of tie gears 290 with racks 276 and 283.

The shaft 269 is secured in a manner previously described to the rack detent and rebound cam 316 so that the cam is enabled to perform its function of holding the detent latches 306 and rebound latches 347 disabled during part of the total cycle and the first portion of the succeeding cycle. The function of cam 268 (Fig. 11) also fast on the shaft 269 has been fully explained earlier in the specification. For almost two complete machine cycles the naught block 251 remains down.

DESIGNATING MECHANISM

The mechanism referred to earlier in the specification, whereby printing is effected only during certain designated machine cycles, is located in the front of the machine (see Figs. 3, 4, and 20) and operates to effect the release or retention of the printing hammers 109. Mechanism for this purpose has been long used in the Powers machine and has been disclosed in several previous applications. For example, the application of William W. Lasker, S. N. 693,541, filed Oct. 14, 1933, discloses designating mechanism of a type similar to that employed herein.

The 25 sector printing unit of the present machine has been divided into three separate units, thus necessitating the use of three designating devices. As previously stated, the first or First number unit must be controlled in such a manner as to print only the number on the first card following a total. The second or Last number unit must print only the number on the last card of a sequence. The third or Total unit must print the total number of cards in a sequence. One of the designating devices, therefore, must operate in such a manner as to permit printing only on the first operation following a total, whereas the other two devices must operate to permit printing in their units only on total taking operations.

Referring now to Fig. 20, a detailed view of one of the designating units is shown therein. All of the units are constructed alike so that a description of one will suffice for all. Each of the printing hammers 109 is separately controlled by a latching member 432 pivoted to a shaft 433 supported by auxiliary fixed frame pieces in the machine. Links 434 are adapted to be pushed forwardly in a manner shown in the aforementioned Lasker Patent 2,066,407 to disable the latches 432 and render the hammers 109 effective. Positioned just above the hammers 109, and individual to each of the three units, is a bail 435 formed with forwardly extending arms 436 pivoted to a shaft 437 supported between side frames 7. The right-hand arm 436 extends forwardly of its pivot 437 and is connected to a downwardly extending link 438 guided by an arm 439 pivoted on a shaft 441 suitably supported between fixed frame plates. Secured to the shaft 437 is an arm 442 having a stud 443 which extends through a slot cut in the upper end of a downwardly extending link 444 guided by a fixed shaft 445. The link 438 has a notch 446 cut in its forward edge through which extends a stud 447 on the link 444. A spring 448 is tensioned between the stud 447 and a stud on the link 438 and so serves to maintain the stud 447 and the lower shoulder of the notch 446 in contact. It is apparent that vertical sliding movement of either link 438 or 444 will be imparted to its associated link through spring 448 or notch 446 and stud 447. As shown in Fig. 20, the rear edge of the link 444 is formed with a shoulder adapted to be engaged by a latch 449 pivoted on the shaft 445. When the latch 449 is in effective position, the link 444 is held upward, as shown in Fig. 20, at the same time holding the link 438 elevated to retain the bail 435 in its open or ineffective position. In the first unit the mechanism is set to this position by a total-taking operation, in a manner later to be described. The latch 449 extends below its pivot point 445 and its lower end is formed with a laterally projecting lug 451 and a spring hook 452. The lug 451 extends in front of another latch member 453, pivoted on shaft 445, and adapted to cooperate with the bottom of the link 444. A spring 454 is tensioned between the hook 452 and the rear end of a bell-crank lever 455 also pivoted on the shaft 445. The lever 455 is tensioned to move in a clockwise direction (Fig. 20) by a spring 456 connected at one end to a forwardly extending arm of the bell-crank and at its other end to a fixed frame piece 457. The tension thus imparted to lever 455 is transmitted to the latch 449 through spring 454 and tends to maintain the blocking portion of the latch in contact with the rear edge of the link 444. Another, and downwardly extending arm 458 of bell-crank lever 455 has its lower end positioned just behind, and resting against, the lug 451. The previously mentioned latch 453 is tensioned to move in a counter-clockwise direction about its pivot 445 by a spring 459 tensioned between an arm of the latch and a stud on the link 444. Another arm of the latch 453 limits against a stud 461 on the rear of the lever 455, however, thereby causing the latch to follow the movements of the lever.

Positioned to the rear of the hammer latches 432 of each unit is a plate 462 pivotally mounted on rod 433 and adapted to rock in a clockwise direction about this rod each time any one of the latches is disabled. The plate 462 lies directly above the rear of the bell-crank lever 455. With the mechanism positioned as shown in Fig. 20, the operation of any latch 432 will rock the bell-crank lever 455 counter-clockwise against the tension of spring 456, thus enabling the arm 458 thereof to disable the latch 449 and render the latch 453 effective to engage the bottom of link 444. Between the time of the disengagement of latch 449 and the engagement of latch 453, the link 444 is permitted to move a very short distance downwardly. Then, when the pressure of plate 462 is released, the lever 455 restores to normal, the latch 453 is disengaged and the latch 449, instead of returning to position beneath the shoulder on link 444, abuts against the extreme rear edge of the link and hence is ineffective. The link 444 immediately descends, under tension of the spring 459, until the upper end of the slot contained therein contacts the stud 443. The link 438 will move downward at the same time, through stud 447, to rock the bail 435 in a clockwise direction to closed or effective position. With the bail 435 thus positioned the lip of the hammers 109 will engage the lower edge of the bail, after they are released by latches 432, and so be prevented from effecting printing. In the first number unit the non-print bail 435 will always function in the above manner. A total taking operation will disable the bail and position the mechanism according to Fig. 20. The first actuation of the hammers 109 after a total will set the non-print bail to effective position where it will be retained until the next total operation.

A total taking operation effects the designating units in the following manner: As shown in Fig. 4 a lever 463 is secured to the total shaft 185 near its left-hand end, and bears a roller 464 adapted to operate another lever 465 pivoted, near its mid-point, to a stud on the left-hand frame piece 7. The upper end of the lever 465 bears against a roller 466 on the lower end of an arm 467 fast to the shaft 437. It is evident that the operation of shaft 185, in the previously described manner, will rock the lever 465 clockwise and impart, through arm 467, an opposite rocking motion to the shaft 437. Counter-clockwise motion of shaft 437 will lift link 444, and, through it, tend to rock link 438 and the non-print bail to open or ineffective position and to render the latch 449 again effective. However, referring again to Fig. 20, a lever 468 is pivoted to the lower end of the link 438 and is formed with its upper end bent over in the form of a rearwardly extending nose. Pivoted on the previously mentioned shaft 441 is a bell-crank lever 469 having a stud on its forwardly extending arm which lies just over the nose of the lever 468. The lever 469 has a downwardly extending arm bearing a stud 471 cooperable with the upper end of an arm 472 secured to the shaft 185. With the lever 468 positioned as shown in Fig. 20, therefore, the operation of shaft 185 will rotate the bell-crank lever 469 a short distance in a clockwise direction (Fig. 20), thereby forcing down the lever 468 and link 438 against the tension of spring 448. The bail 435 is thus moved to, or retained in, closed or effective position during total taking operations.

The lower end of the lever 468 has a bent-over portion 473 which lies directly in the path of a manually operable plunger 474. The plunger 474 has two positions, one as shown in Fig. 20, in which position it is normally retained by a spring not shown herein, and the other in which it is pushed rearwardly against the tension of its spring and retained thereby a stud 474A on the plunger and a cooperating lock plate 475. If the plunger 474 is moved in, it is evident that the lever 468 will be rocked far enough in a clockwise direction to render the bell-crank 469 ineffective. With the plunger 474 in, therefore, the shaft 437 is effective to disable the non-print bail 435, thus permitting the hammers 109 of that unit to print on total strokes. Mechanism is also provided, effective when the plunger 474 is in, for disabling the latch 449 and so preventing printing during all normal accumulating and comparing cycles. A lever 476 is pivoted on the shaft 441 and has its lower end positioned just behind the turned-over portion 473 of lever 468. The upper end of the lever 476 bears against the rear of the lug 451 of the latch 449. Operation of the plunger 474 will, therefore, not only disable the bell-crank lever 469 but at the same time will rock the latch 449 out of engaging position to permit the slides 444 and 438 to drop, thus blocking the printing hammers 109.

The particular style of designating mechanism shown and described above is, therefore, capable of two methods of operation. First, with the plunger 474 out, at which time the unit controlled thereby will print only the first number after a total, second, with the plunger 474 in, which operates to permit the printing of totals only. There is a plunger 474, and an associated designating device for each unit of the machine.

In the first number unit the designating plunger should be out. In the last number and total units, the plunger should be in.

LINE SPACE MECHANISM

As mentioned earlier in the description there is also provided in the present machine a standard type of line space mechanism which may be set to operate only during total cycles. Line space mechanism of a type similar to that employed herein has long been used in the Powers tabulators so that only a brief description of its operation and construction is included in the present description. The line space mechanism shown herein is substantially the same as that disclosed in the patent to E. H. Dreher, No. 2,059,215, issued November 3, 1936. As shown in Fig. 10 the previously mentioned bell-crank lever 123 which is secured to the right-hand end of the shaft 124 has an arm 477 engaging a slot formed in the rear of a forwardly extending link 478. The front end of the link 478 is adjustably secured to another link 479 which is in turn connected to a lever 481 pivoted at 482 to a suitable frame piece. The lever 481 extends above and beyond its pivot 482 and has one end of a link 483 connected to its upper end. The other end of the link 483 is connected to one arm of a bell-crank lever 484 pivoted at 485 to a fixed frame piece 486. A link 487 is connected to the other arm of the bell-crank 484 and a second link 488 is adjustably secured to the upper end of link 487, the link 488 being in turn connected to a short arm 489 fast on a shaft 491. The shaft 491 extends the entire width of the machine and is loosely supported by frame brackets 492 (see also Fig. 4). As shown in Fig. 4, the opposite end of the shaft 491 is provided with a similar arm 489A, similar links 488A and 487A and a similar bell-crank lever 484A. Identical springs 493 and 493A, tensioned between the respective bell-crank levers 484 and 484A and studs on the side frames 7, are provided to urge the levers 484, 484A and the shaft 491 in a counter-clockwise direction (Fig. 10). In the normal position of the machine, however, the shaft 491 is prevented from rocking by the arm 477, a stud on which normally lies in the rear of the slot in link 478. When the shaft 124 is rocked, in the manner previously described, the tendency of the links 478 and 479 is to move forward under tension of the springs 493 and 493A to permit the rocking of shaft 491. Return movement of the shaft 124 will, of course, return the links 478, 479 and their associated mechanism to normal. Thus, the normal tendency of the machine is to rock the shaft 491 once for each machine cycle. The shaft 491 controls the platen feed on line space mechanism in a manner shown in the Patent 2,059,215 and is adapted to feed the platen one step each time the shaft is rocked. In order that the shaft 491 may be rocked only on total strokes, mechanism is provided, controlled by the total shaft 185, which prevents the release of the links 478 and 479 during normal machine operations. The lever 481, as shown in Fig. 10, is formed with an abutment or shoulder 494 adapted to cooperate with a turned-over portion 495 of a plate 496 slidably mounted in any suitable manner on a fixed frame plate. In the present machine the plate 496 is spring tensioned upward so that the turned over portion 495 thereof normally lies directly in front of the shoulder 494 and so prevents the operation of the lever 481 and the entire assembly including shaft 491. The plate 496 is adapted to be disabled only during total operations by an arm 497, secured to the right-hand end of the shaft 185, adapted, when the shaft is rocked to depress the plate 496 through a stud 498 thereon. Thus, when the shaft 124 is rocked on total strokes, the shaft 491 is free to move and advance the platen one step to bring a new printing line into position.

TIMING DIAGRAM

Referring now to Figs. 25 and 26 there is shown therein four cycles of machine operation with the mechanism of the invention diagrammatically timed in relation to the movement of the main shaft 1. The four cycles and the order in which they follow are respectively, Add, Idle (space or blank), Total, and Normal. The normal cycle is in reality the first add cycle following a total and is termed Normal merely to indicate that the total mechanism is completely reset and the machine normalized. A grand total operation has not been shown in the present diagram, since the mechanism of the invention functions in substantially the same manner during both the Total and Grand total periods.

Considering first the Add cycle, it will be seen that the card is fed by the picker knife 37 (Fig. 1) from 80° to 170° and that the knife is gradually returned from that point until it reaches normal at 336°. Just prior to 170°, however, the card is picked up by the feed rolls 49 and 51 and fed into the sensing chamber itself. The card stop 54 (Fig. 1) is normally closed. At 113½° it begins to open. At 131½° it is fully open and remains in that position until 193½°, when it begins to close. At 211½° the card stop is fully closed. During the time the card stop is open one card is ejected from the sensing chamber and immediately after the stop again descends a new card comes to rest against its surface. The locking slides 63 are retracted once each machine cycle by the cam 25 (Fig. 2). Retraction begins at 334° and ends at 1½° of the following cycle. The lower pin-box is operated by the eccentric disc 50 (Fig. 1) and its motion is a harmonic rise and fall once each machine cycle. The pin box is normally up. It begins to descend at 0°, reaches its lowermost position at 180°, and immediately starts up again to reach normal at 360°. The sector rock shaft 124 (Fig. 3) also has a harmonic reciprocatory motion since it requires 180° to move the restoring arms 106 and 134 to their farthest extended position and another 180° to return them to normal. The actuating sectors 87 reach their zero stops 88 at 70°, and all of the sectors are fully restored at 310°. A certain amount of overthrow is permitted the restoring arms or bail 105 during each 180° of movement.

The special sectors 87A are released by the sector firing cam 137 (Fig. 9) at 346° of each add or normal cycle. The sectors immediately jump forward under tension of their springs 103 and have completely settled in their forward position by 10° of the following cycle. Shortly after the special sectors have settled in extended position, the sensing cam 355 (Fig. 14) releases the parallel links 367 and the links attempt to rise. As previously described, if the machine is in sequence the released sensing mechanism is ineffective to trip a total. If out of sequence the parallel links 367 are permitted to rise and a total is tripped as shown in Sequence sensing on the diagram. This attempted sensing takes place at 26°. The low point of cam 355 remains in effective position until 46° and then the sensing mechanism starts to disable until 66° when it is completely restored to normal. In the add cycle hereof the machine is shown in sequence and the cam 355 ineffective. The counting cam 326 (Fig. 13) is adapted to advance its actuating pawls 339 once for each cycle of the machine. From 75° to 145° the pawls move forward and from 145° to 200° they return to normal.

The card count or naught block 249 (Fig. 7) is controlled solely by the special wire 74 and rises and falls with the wire. As described above as long as each successive card bears the special control hole necessary to raise wire 74, the wire and block 249 will remain elevated. During idle and total strokes, however, the locking slides 63 are disabled and all translator wires rise and fall with the lower pin box. The card count block 249, therefore, is up during the Add cycle. The other naught block 251 (last number) (Fig. 7) is controlled, during add cycles, by the cam 267 (Fig. 11) and is normally held depressed. As soon as cam 267 begins to rotate, the naught block actuating arm 262 begins to rise and the block 251 itself begins to rise. At 40° the block is entirely up in which position it remains until 280° when it starts down. At 340° the block is entirely down and, if the machine continues to operate, it will immediately start up again. Due to a clutch drag invariably encountered in this type of machine, the machine will stop at or about 340°.

IDLE CYCLE

As mentioned above the firing cam 137 releases the special sectors 87A at 346° of each add cycle and the sectors are completely settled at 10° of the following cycle. Now, at 26° of this cycle the low point of the sensing cam 355 comes into effective position and the parallel links 367 immediately sense or compare the relative arrangement of racks 276 and 283. Assume now that the machine is out of sequence and the racks are not identically arranged. One or more links 367 will thus be permitted to rise to their full extent and at 36° the shaft 377 will be rocked to trip off a total in the previously described manner. When the total trip shaft 940 (Fig. 21) is rocked the machine indexes into the idle or blank cycle which precedes a total at about 40°, thus causing the disabling of the card feed mechanism, the retention of the card stop in closed position, and the operation of the retract mechanism to unlock the slides 63. Simultaneously, with the above operations, the shaft 159 (Figs. 3 and 9) is rocked to cause the positive elevation of the zero stops 88 and to render the sector firing cam 137 ineffective. Inasmuch as the printing sectors 89 do not reach their zero position until 70°, it is apparent that they will be retained in retracted position during the idle cycle. The counting cam 326 functions during the idle cycle but the advancement of a rack 283 is without consequence since the machine is already in a total taking operation. The control wire 74, and, therefore, the card count block 249, is permitted to drop down immediately upon the unlocking of the slides 63. At 65° the block 249 is entirely down and remains so until 290° when the translator wires start to rise under the influence of the lower pin box. At 350° the block is entirely up again. The naught block 251 continues to function in its usual manner through the idle cycle, but, since no printing sectors are released, its operation is ineffective.

TOTAL CYCLE

As noted in the previous cycle the sector trip cam 137 is unable to release the special sectors 87A at 346° of the idle cycle so that the sectors and their racks 276 are released and returned as a unit by the sector rock shaft 124, returning to their original position at approximately 310° of the total cycle. The card count block 249, which was up at 350° of the idle cycle, remains up until 40° of the total cycle when the falling lower pin box permits the translator wires and block 249 to again drop. The block is entirely down at 65° and remains down until 290°. At 290° the block again starts up reaching its elevated position at 350°. The sensing cam 355 operates again at 26° of this cycle and, since block 249 is raised at this time and racks 276 and 283 are not identically arranged, the shafts 377 and 209 will again be rocked to attempt to trip another total. This is merely an artificial and ineffective motion, however, since the latch 1440 (Fig. 21) prevents the release of the pawl 990 which operates the shaft 970. The retract, card feed, and card stop mechanisms retain the same position throughout the total cycle that they assumed during the idle cycle. At the end of the idle cycle the shaft 159 is returned to normal thus permitting the release of the sectors 89 during the total cycle and an effective operation of cam 137 at the end of the same cycle. It is to be here noted that, by reason of the setting of the designation mechanism described on pages 18 and 19, supra, the first card number is printed in the beginning of the run of the cards of a group through the machine. On the other hand, also by reason of the setting of the designation mechanism, the number of the last card of a group, and the number of the cards in a group, are not printed until a total taking operation. The line spacing mechanism, as explained on pages 19 and 20, is also blocked out of operation until the total shaft 185 is operated, so that the machine is not spaced until after the total is accumulated and printed. Consequently, the first number, last number, and number of cards in a group are printed on the same line.

As previously explained the normal function of naught block 251 is to begin to rise at 340° of one cycle and to be completely up at 40° of the following cycle. Approximately at the beginning of, or very shortly after, the start of the total cycle, however, the single revolution shaft 269 begins to rotate and at 25° of this cycle the naught block disabling cam 268 thereon picks up the lever 262 forcing it and the naught block 251 down. At 40° the block is completely down. Thus, by the time the printing sectors 89 reach zero at 70° both blocks 249 and 251 are down. The rack tie gears 290 are normally out of engagement with the racks 276 and 283 but, during total cycle, begin to drop into engagement, under the influence of cam 429 (Fig. 4), at 300°. At 340° of the cycle the gears are entirely in. The rack detent pawls 306 (Fig. 14) are normally caused to engage their respective gear segments 311 by the cam 316 (Fig. 9). At 174° of the total cycle, however, the detents begin to withdraw from the racks and at 210° are entirely out and the comparing racks 283 are free to return to normal under tension of the springs 288 and 291.

NORMAL CYCLE

At the end of the total cycle the card feed, card stop, and retract mechanisms are released from the influence of the total taking mechanism and begin again to operate in their usual manner. At 346° of the total cycle the special sectors 87A spring forward carrying with them racks 283, through tie gears 290. The racks are sensed at 26° and found in sequence. The detent pawls 306 start down to engage their racks at 74°. The counting cam 326 begins its operative motion at 75° to advance the unit rack 283 one step, and the tie gears 290 start out of engagement with their racks at 110° and reach normal raised position at 180°. The gears are, however, completely disengaged from their racks prior to 145° which is the time at which the units rack 283 is advanced. Since the machine has normalized from its total taking operation the locking slides 63 are again effective and the card count block 249 remains up throughout the normal cycle, and counts one into its accumulator in the usual manner. The naught block disabling cam 268 remains in effective position until 330° of the normal cycle when the operation of the naught block shifts back to the constantly revolving cam 267. Thus, the block 251 is held depressed during the normal cycle following a total and the number of the first card of a new sequence is accumulated in the Last number unit. The shaft 269 ceases to rotate at the end of the normal cycle and will not revolve again until the next total taking operation.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a tabulator adapted to operate upon serially numbered record cards arranged in a plurality of groups of sequentially numbered cards, record sensing means, a normally inactive total-taking control device, a rack controlled by said sensing means for setting up a representation of a digit of the number of each card, a second rack, means under control of the total-taking control device to advance the second rack with the first rack when the number of the first card of a series is being set up, normally effective means to retain the second rack in a setting representative of the number of the first card of a series, cyclically operated means to change this retained setting to the representation of the assumed number of successive cards, cyclically operated means to compare the settings of the two racks, and means operated by the comparing means to render active said total taking control device when the settings of said racks do not represent the same number.

2. In a tabulator adapted to operate on serially numbered sequentially arranged record cards, the combination of a record sensing device for sensing successive cards, a total-taking control device, a group of settable elements cyclically operated, and controlled by the sensing device, to represent the numbers of successive cards, a second group of settable elements, means under control of the total-taking control device and operative only on the first machine cycle after a total taking operation to couple said two groups of elements whereby they are advanced to positions representing the number of the first card of a group, cyclically operated means for changing the successive settings of the second group of elements to represent the number the next card should have, a cyclically operated means for comparing the successive settings of the two groups of elements, and means operated by the comparing means to initiate the operation of said total taking control device when these settings do not agree.

3. In a tabulator adapted to operate on serially numbered sequentially arranged record cards, the combination of a normally inactive total-taking control device, a record sensing device, a plurality of racks controlled by said sensing device and cyclically settable to represent numbers of successive cards, a second plurality of settable racks, means under control of the total-taking control device and operative on the first machine cycle after a total-taking operation to effect the setting of the second plurality of racks to represent the serial number of the first card of a group, cyclically operated means to change the successive settings of the second plurality of racks to represent the serial number the next card should have, cyclically operated means to compare the settings of the two sets of racks, and means operated by said comparing means when the rack settings do not represent the same number to render active the total-taking control device.

4. In a tabulator adapted to operate upon serially numbered record cards arranged in a plurality of groups of sequentially numbered cards, record sensing means, a normally inactive total-taking control device, a group of settable elements under the control of the sensing means for setting up therein a representation of the serial number of successive cards, a second group of settable elements, means under control of the total-taking control device and effective only on the first machine cycle following the taking of a total for effecting the positioning of the second group of elements to represent the number of the first card of a series, normally effective means to retain the second group of elements in advanced position, cyclically operated means to change the setting of the second group of elements to represent the number the next card should have, cyclically operated means to compare these settings, and means operated by the comparing means to render said control device active when the settings do not represent the same number.

5. In a tabulator adapted to operate on serially numbered record cards arranged in a plurality of groups of sequentially numbered cards, record sensing means, a total-taking control device, a number representing device settable under the control of the sensing means to represent the serial numbers of successive cards, a second number representing device, means under control of the total-taking control device and operable only on the first machine cycle after a total-taking cycle to effect the setting of the second device to represent the serial number of the first card of a group, cyclically operated means to change the setting of the second device to represent the number the next card should have, a cyclically operated device to compare the settings of the two number representing devices, means on said number representing devices to limit the movement of the comparing device when the two settings agree, and means connecting the comparing device with the total-taking control device to actuate the latter when the movement of the comparing device is not limited.

6. In a tabulator adapted to operate on serially numbered record cards arranged in a plurality of groups of sequentially numbered cards, a device to sense successive cards, a normally inactive total-taking control device, a plurality of elements controlled by the sensing device to be set up to represent numbers of successive cards, a second plurality of elements to be set up to represent card numbers, means under control of the total-taking control device and operable only on the first machine cycle after a total-taking operation to effect the setting of the second plurality of number representing elements to represent the number of the first card of a group, cyclically operated means to change the setting of the second plurality of elements to represent the number the next card should have, a cyclically operated device to compare the settings of the two pluralities of elements, means actuated by the comparing device when its movement is unlimited for actuating said total taking control device, means on the two pluralities of elements to limit the movement of the comparing device when the two set-ups agree whereby the total-taking control device is maintained inactive.

7. In a tabulator adapted to operate on serially numbered sequentially arranged record cards, the combination of a record sensing device, an accumulator, a normally inactive total-taking control device, a naught block associated with said accumulator, cyclically operated means tending to operate the naught block for each machine cycle to add one into said accumulator, means under the control of the total-taking control device to disable the naught block during a total taking cycle and during the sensing of the first card of a group after a total-taking cycle, means operated by the sensing device to enter the number of the first card of a group into the accumulator when the naught block is disabled, a group of settable elements cyclically operated and controlled by the sensing device to represent the serial number of successive cards, a second group of settable elements, means under the control of the total-taking control device and operative on the first machine cycle after a total-taking operation to effect the setting of the second group of elements to represent the serial number of the first card of a group, cyclically operated mean to change the successive settings of the second group of elements to represent the serial number the next card should have, cyclically operated means to engage and compare said groups of settable elements, and means operated by the comparing means when the settings do not agree to render active said total-taking control device whereby a total is extracted from the accumulator.

JOSEPH M. McDONNELL.

Certificate of Correction

Patent No. 2,280,923. April 28, 1942.

JOSEPH M. McDONNELL

It is hereby certified that error appears in the printed specification of the above numbered patent requiring correction as follows:

Page 15, first column, line 12, for "stud" read *stud 336*; page 19, second column, line 1, for the word "thereby" read *there by*; page 23, first column, line 4, for "mean" read *means*;

and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*